(12) United States Patent
Kim et al.

(10) Patent No.: US 11,895,526 B2
(45) Date of Patent: *Feb. 6, 2024

(54) METHOD AND APPARATUS FOR MEASURING AND REPORTING CHANNEL STATE IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Hoondong Noh, Gyeonggi-do (KR); Jinkyu Kang, Gyeonggi-do (KR); Youngbum Kim, Gyeonggi-do (KR); Jinyoung Oh, Gyeonggi-do (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/981,896

(22) Filed: Nov. 7, 2022

(65) Prior Publication Data

US 2023/0077471 A1 Mar. 16, 2023

Related U.S. Application Data

(63) Continuation of application No. 16/834,357, filed on Mar. 30, 2020, now Pat. No. 11,496,917.

(30) Foreign Application Priority Data

Mar. 29, 2019 (KR) .................. 10-2019-0037332

(51) Int. Cl.
*H04L 5/00* (2006.01)
*H04W 24/10* (2009.01)
(Continued)

(52) U.S. Cl.
CPC ............. *H04W 24/10* (2013.01); *H04L 5/001* (2013.01); *H04L 5/0048* (2013.01);
(Continued)

(58) Field of Classification Search
CPC ..... H04B 17/0082–3913; H04L 1/0001–1896; H04L 5/0001–0098;
(Continued)

(56) References Cited

U.S. PATENT DOCUMENTS 11,496,917 B2 * 11/2022 Kim ...................... H04W 24/10
2019/0207737 A1 * 7/2019 Babaei .................. H04W 24/10
(Continued)

FOREIGN PATENT DOCUMENTS

KR 20190040740 4/2019

*Primary Examiner* — Timothy J Weidner
(74) *Attorney, Agent, or Firm* — The Farrell Law Firm, P.C.

(57) ABSTRACT

The disclosure relates to a communication method and system for converging a 5G communication system for supporting higher data rates beyond a 4G system with a technology for IoT. The disclosure may be applied to intelligent services based on the 5G communication technology and the IoT-related technology, such as smart home, smart building, smart city, smart car, connected car, health care, digital education, smart retail, security and safety services. The disclosure provides a method performed by a terminal in a wireless communication system. The method includes receiving, from a base station, information configuring a list of aperiodic trigger states for CSI; receiving, from the base station, DCI including a CSI request field, wherein each codepoint of the CSI request field is associated with one trigger state of the list and a CSI-RS is triggered based on a trigger state indicated by the CSI request field; identifying whether a BWP in which the CSI-RS is received is non-active; and in case that the BWP in which the CSI-RS is
(Continued)

received is non-active, skipping a measurement of the CSI-RS.

20 Claims, 13 Drawing Sheets

(51) Int. Cl.
   *H04W 72/044* (2023.01)
   *H04W 72/0453* (2023.01)
   *H04W 72/20* (2023.01)
   *H04W 72/23* (2023.01)
   *H04W 72/231* (2023.01)
   *H04W 72/232* (2023.01)
   *H04W 84/02* (2009.01)
   *H04W 88/02* (2009.01)
   *H04W 88/08* (2009.01)
   *H04W 92/02* (2009.01)
   *H04W 92/10* (2009.01)

(52) U.S. Cl.
   CPC .......... *H04L 5/0057* (2013.01); *H04L 5/0094* (2013.01); *H04L 5/0098* (2013.01); *H04W 72/044* (2013.01); *H04W 72/0453* (2013.01); *H04W 72/20* (2023.01); *H04W 72/23* (2023.01); *H04W 72/231* (2023.01); *H04W 72/232* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
   CPC ..... H04W 8/22–245; H04W 24/02–10; H04W 28/02–26; H04W 48/02–20; H04W 72/02–569; H04W 74/002–008; H04W 84/02–16; H04W 88/02–12; H04W 92/02; H04W 92/04; H04W 92/10
   See application file for complete search history.

(56) References Cited

U.S. PATENT DOCUMENTS

| | | |
|---|---|---|
| 2020/0280357 A1 | 9/2020 | Bae |
| 2021/0067304 A1* | 3/2021 | Yokomakura ......... H04W 24/10 |

* cited by examiner

METHOD AND APPARATUS FOR MEASURING AND REPORTING CHANNEL STATE IN WIRELESS COMMUNICATION SYSTEM

CROSS-REFERENCE TO RELATED APPLICATION(S)

This application is a continuation of U.S. Ser. No. 16/834,357, which was filed in the U.S. Patent and Trademark Office on Mar. 30, 2020, and claims priority under 35 U.S.C. § 119 to Korean Patent Application No. 10-2019-0037332, filed on Mar. 29, 2019, in the Korean Intellectual Property Office, the entire disclosure of each of which is incorporated herein by reference.

BACKGROUND

1. Field

The disclosure relates generally to a method and an apparatus for measuring and reporting a channel state in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Application of a cloud RAN as the above-described big data processing technology may also be considered an example of convergence of the 5G technology with the IoT technology.

In 5G, one or a plurality of bandwidth parts (BWPs) may be configured for a terminal, and a bandwidth among the configured BWPs may be activated. A base station may instruct the terminal to activate a particular BWP through downlink control information (DCI) indication, and if a BWP index received through DCI is different from the index of a BWP currently activated, the terminal may change the BWP. Since measuring and reporting of a channel state of a newly activated BWP can be performed after the BWP is activated, the channel state of the new BWP is absent, and it may be difficult to transmit or receive a data channel immediately after the corresponding BWP is changed.

SUMMARY

The disclosure is made to address at least the disadvantages described above and to provide at least the advantages described below.

An aspect of the disclosure is to provide a method and an apparatus for, if an activated BWP is changed in an environment in which a BWP is configured and operated, effectively measuring and reporting a channel state of a changed BWP.

In accordance with an aspect of the disclosure, a method is provided for a terminal in a wireless communication system. The method includes receiving, from a base station, information configuring a list of aperiodic trigger states for channel state information (CSI); receiving, from the base station, downlink control information (DCI) including a CSI request field, wherein a codepoint of the CSI request field is associated with one trigger state of the list, and wherein the one trigger state comprises at least one CSI report configuration, a CSI report configuration comprises a CSI resource configuration, and the CSI resource configuration comprises a bandwidth part (BWP) identifier (ID) and in case that a CSI report for a non-active BWP is triggered based on the CSI request field, a measurement based on a CSI resource in the non-active BWP is not performed.

In accordance with another aspect of the disclosure, a method is provided for a base station in a wireless communication system. The method includes transmitting, to a terminal, information configuring a list of aperiodic trigger states for channel state information (CSI); and transmitting, to the terminal, downlink control information (DCI) including a CSI request field. A codepoint of the CSI request field is associated with one trigger state of the list, the one trigger state comprises at least one CSI report configuration, a CSI report configuration comprises a CSI resource configuration, and the CSI resource configuration comprises a bandwidth part (BWP) identifier (ID). In case that a CSI report for a non-active BWP is triggered based on the CSI request field, a measurement based on a CSI resource in the non-active BWP is not performed.

In accordance with another aspect of the disclosure, a terminal is provided for a wireless communication system. The terminal includes a transceiver; and a controller configured to receive, from a base station, information configuring a list of aperiodic trigger states for channel state information (CSI), receive, from the base station, downlink control information (DCI) including a CSI request field, wherein a codepoint of the CSI request field is associated with one trigger state of the list, and wherein the one trigger state comprises at least one CSI report configuration, a CSI report configuration comprises a CSI resource configuration, and the CSI resource configuration comprises a bandwidth part (BWP) identifier (ID), and in case that a CSI report for a non-active BWP is triggered based on the CSI request field, a measurement based on a CSI resource in the non-active BWP is not performed.

In accordance with another aspect of the disclosure provides a base station is provided for a wireless communication system. The base station includes a transceiver; and a controller configured to transmit, to a terminal, information configuring a list of aperiodic trigger states for channel state information (CSI), and transmit, to the terminal, downlink control information (DCI) including a CSI request field. A codepoint of the CSI request field is associated with one trigger state of the list, the one trigger state comprises at least one CSI report configuration. a CSI report configuration comprises a CSI resource configuration. and the CSI resource configuration comprises a bandwidth part (BWP) identifier (ID). In case that a CSI report for a non-active BWP is triggered based on the CSI request field, a measurement based on a CSI resource in the non-active BWP is not performed.

BRIEF DESCRIPTION OF THE DRAWINGS

The above and other aspects, features and advantages of certain embodiments of the disclosure will be more apparent from the following description taken in conjunction with the accompanying drawings, in which.

DETAILED DESCRIPTION

Figure 1:
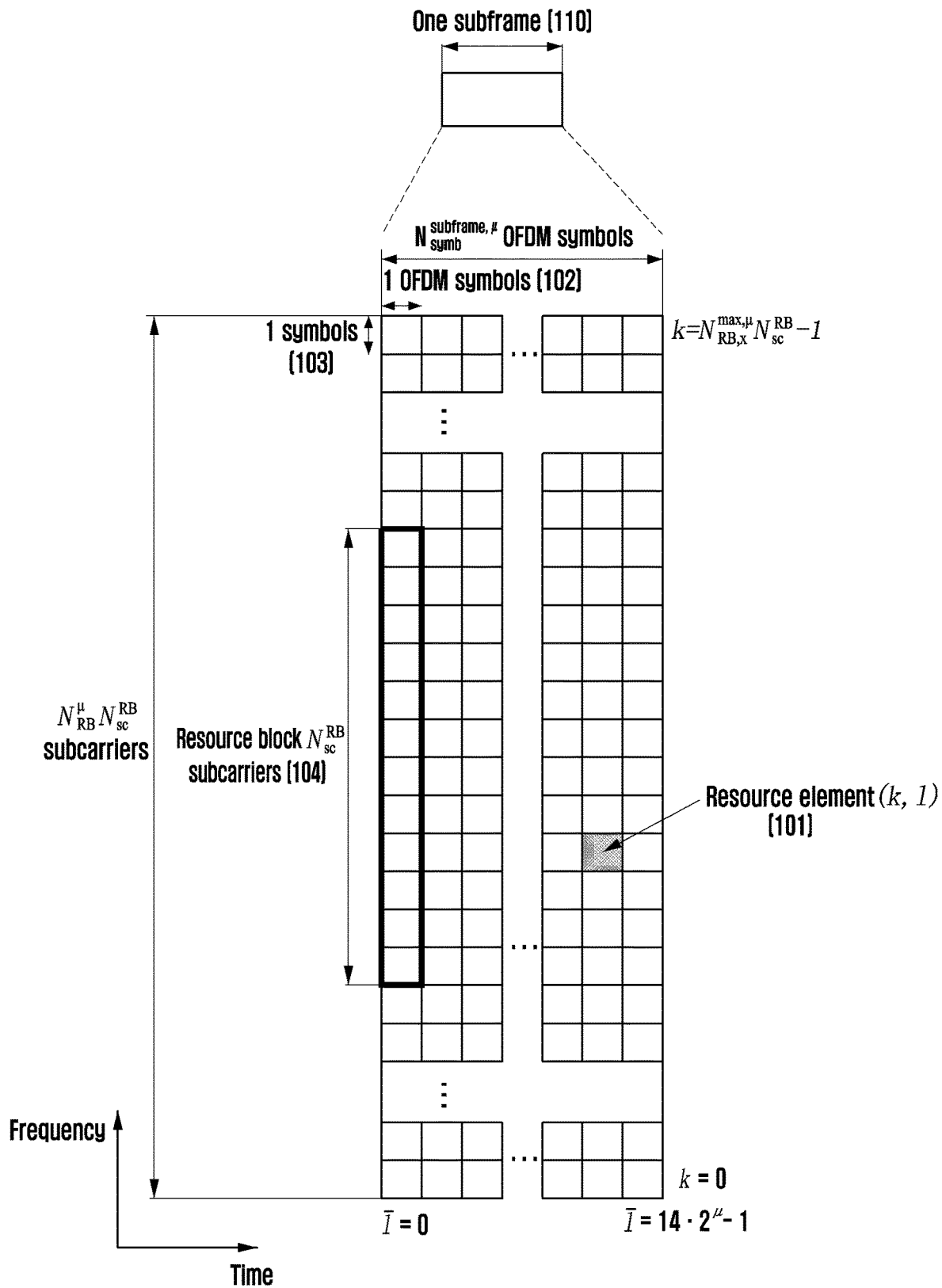
FIG. 1 illustrates a time-frequency domain in 5G according to an embodiment.

Hereinafter, various embodiments of the disclosure will be described in detail with reference to the accompanying drawings. In the following description of embodiments of the disclosure, a 5G system will be described by way of example, but the embodiments of the disclosure may be applied to other communication systems having similar backgrounds or channel types. Examples of such communication systems may include the LTE or LTE-advanced (LTE-A) mobile communication system and post-5G mobile communication technologies to be developed in the future. Therefore, the embodiments of the disclosure may be applied to other communication systems through some modifications without significantly departing from the scope of the disclosure.

In the following description of the disclosure, a detailed discussion of known functions or configurations incorporated herein will be omitted when it may make the subject matter of the disclosure unclear. The terms which will be described below are defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by referring to embodiments as described below in detail in conjunction with the accompanying drawings. However, the disclosure is not limited to the embodiments set forth below and may be implemented in various forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Each block of the flowcharts, and combinations of blocks in the flowcharts, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowcharts may represent a module, segment, or portion of code, which includes one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

A "unit" refers to a software element or a hardware element, such as a Field Programmable Gate Array (FPGA) or an Application Specific Integrated Circuit (ASIC), which performs a predetermined function. However, the term "unit" does not mean software or hardware. A "unit" may be constructed either to be stored in an addressable storage medium or to execute one or more processors. Therefore, the term "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". The elements and "units" or may be implemented to reproduce one or more central processing units (CPUs) within a device or a security multimedia card. Further, a "unit" may include one or more processors.

A base station performs resource allocation to a terminal, and may be one of a gNode B, an eNode B, a Node B, a wireless access unit, a base station controller, or a node on a network. A terminal may include a user equipment (UE), a mobile station (MS), a cellular phone, a smartphone, a computer, or a multimedia system capable of a communication function. However, the disclosure is not limited to the examples above.

In addition, an embodiment will be described based on an example of a new radio (NR) system or an LTE/LTE-A system. However, the embodiment may be also applied to another communication system having a similar technical background or channel type. In addition, an embodiment may be also applied to another communication system through partial modification without departing from the scope of the disclosure as a determination of a person who skilled in the art.

Hereinafter, for convenience of explanation, part of terms and names defined in 3rd generation partnership project (3GPP) LTE standards will be used in the disclosure. However, the disclosure is not limited to the terms and names and may be applied to a system following other standards in the same way.

A wireless communication system has developed to be a broadband wireless communication system that provides a high speed and high quality packet data service, e.g., using communication standards such as high speed packet access (HSPA), LTE or evolved universal terrestrial radio access (E-UTRA)), LTE-A, and LTE-Pro of 3GPP, high rate packet data (HRPD), and ultra mobile broadband (UMB) of 3GPP2, 802.16e of IEEE, etc., beyond the voice-based service provided at the initial stages.

An LTE system, which is a representative example of the broadband wireless communication system, employs an orthogonal frequency division multiplexing (OFDM) scheme for a DL, and employs a single carrier frequency division multiple access (SC-FDMA) scheme for an uplink (UL). UL denotes a wireless link for transmitting data or a control signal by a terminal to a base station, and DL denotes a wireless link for transmitting data or a control signal by a base station to a terminal. In the multiple access schemes described above, time-frequency resources for carrying data or control information are allocated and managed in a manner to prevent overlapping of the resources between users, i.e., to establish the orthogonality, in order to identify data or control information of each user.

A future communication system after LTE, i.e., a 5G communication system, should freely apply various requirements from a user, a service provider, etc., in order to support a service satisfying all of the various requirements. Services considered for 5G communication systems may include enhanced mobile broadband (eMBB), massive machine type communication (mMTC), ultra-reliability low-latency communication (URLLC), etc.

The purpose of eMBB is to provide a data rate enhanced more than a data rate supported by the existing LTE, LTE-A, or LTE-Pro. For example, in a 5G communication system, eMBB should provide a peak data rate of 10 Gbps for UL and a peak data rate of 20 Gbps for DL in view of a single base station. The 5G communication system should also provide the peak data rates and an increased user perceived data rate of a terminal.

In order to satisfy the requirements described above, a 5G communication system requires the improvement of various transmission/reception technologies including further enhanced MIMO transmission technology.

In addition, while current LTE uses, for the transmission of a signal, a maximum transmission bandwidth of 20 MHz in a band of 2 GHz allocated to in LTE, a 5G communication system uses a frequency bandwidth greater than 20 MHz in a frequency band of 3-6 GHz or a frequency band of 6 GHz or greater to satisfy a data transfer rate required for the 5G communication system.

In a 5G communication system, mMTC has been considered to support application services such as the IoT. mMTC requires the support of massive terminal connection in a cell, the improvement of terminal coverage, improved battery lifetime, terminal cost reduction, etc., in order to efficiently provide the IoT. Because IoT is often mounted in various sensors and devices to provide communication functions, mMTC is also required to support many terminals (e.g., 1,000,000 terminals/km2) in a cell. A terminal supporting mMTC requires a wider coverage compared to other services provided in a 5G communication system because, due to the nature of mMTC, it is probably that the terminal will be disposed in a radio shadow area, such as the basement of a building, which a cell fails to cover. A terminal supporting mMTC is required to be inexpensive and have a very long battery life of, e.g., 10-15 years, because it is hard to often change the battery of the terminal.

URLLC is a cellular-based wireless communication service used for a particular purpose (e.g., mission-critical). Services used in remote control for robots or machinery, industrial automation, unmanned aerial vehicle, remote health care, emergency alert, etc., may be considered for URLLC. Therefore, communication provided by URLLC should provide very low latency and very high reliability. For example, a service supporting URLLC should satisfy a wireless connection latency time (e.g., air interface latency) smaller than 0.5 milliseconds and a packet error rate of 10-5 or smaller at the same time. Therefore, for services supporting URLLC, a 5G system requires a design for providing a transmission time interval (TTI) shorter than those of other services and allocating a wide domain of resources in a frequency band to secure the reliability of a communication link.

Three services of 5G technology, i.e., eMBB, URLLC, and mMTC, may be multiplexed and then transmitted in a single system. In order to satisfy different requirements of the services, different transmission/reception schemes and different transmission/reception parameters may be used for the services, respectively.

FIG. 1 illustrates a time-frequency domain in a 5G system according to an embodiment.

Referring to FIG. 1, the horizontal axis indicates a time domain, and the vertical axis indicates a frequency domain. In the time-frequency domain, a basic unit of a resource may be defined as a resource element (RE) 101, i.e., one OFDM symbol 102 in the time axis and one subcarrier 103 in the frequency axis. In the frequency domain, $N^{RB}_{SC}$ consecutive REs (e.g., 12) may configure a single resource block (RB) 104. One subframe 110 may be configured by N symbols 102, and the length of the subframe may be 1.0 ms. The number of the symbols (N) included in one subframe 110 may be different according to subcarrier spacing.

Figure 2:
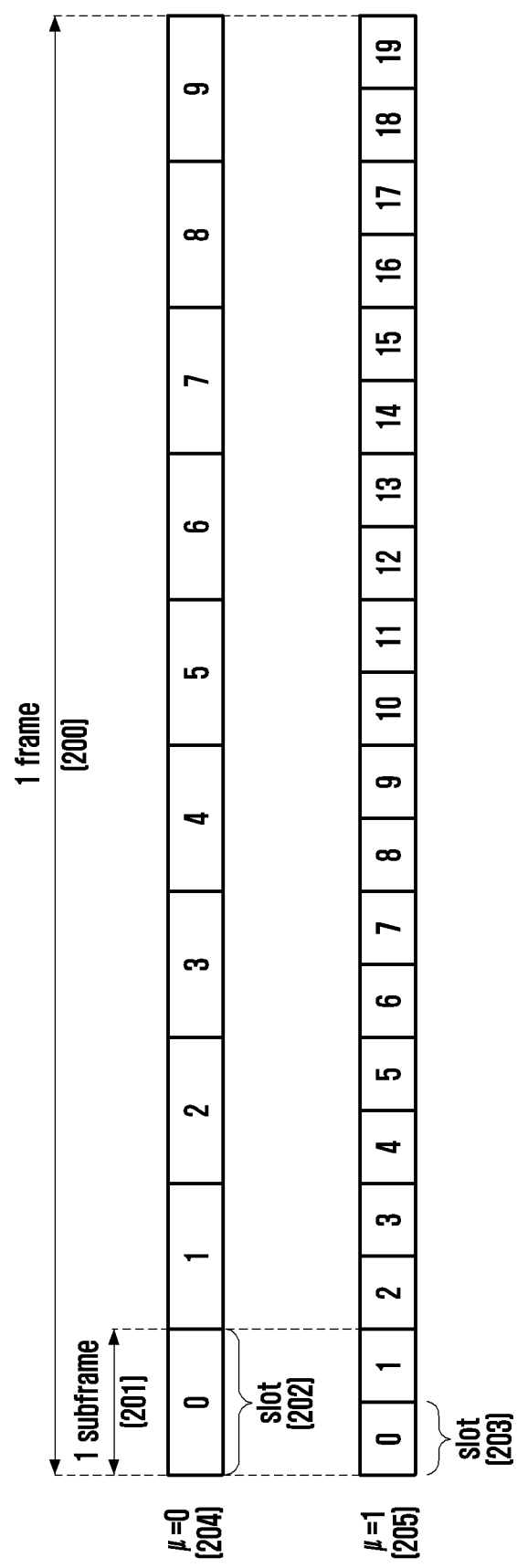
FIG. 2 illustrates a frame, subframe, and slot structure in 5G according to an embodiment.

FIG. 2 illustrates a frame, subframe, and slot structure in a 5G system according to an embodiment.

Referring to FIG. 2, a frame 200 includes a subframe 201, which includes a slot 202 or 203. The frame 200 may be defined as 10 ms, where the subframe 201 is defined as 1 ms, and thus the frame 200 may be configured by a total of 10 subframes 201. One slot 202 or 203 may be defined as 14 OFDM symbols (i.e., the number ($N^{slot}_{symb}$) of symbols per one slot=14). One subframe 201 may be configured by one slot 202 or a plurality of slots 203, and the number of slots 202 or 203 per one subframe 201 may be different according to a configuration value p 204 or 205 of subcarrier spacing.

FIG. 2 illustrates examples in which a subcarrier spacing configuration value μ 204 is 0, and a subcarrier spacing configuration value μ 205 is 1. If μ is 0 (204), one subframe 201 may be configured by one slot 202. If μ is 1 (205), one subframe 201 may be configured by two slots 203. That is, the number of slots per one subframe ($N^{subframe}_{slot}$) may be different according to a configuration value μ of a subcarrier spacing, and according thereto, the number of slots per one frame ($N^{frame}_{slot}$) may be different. $N^{subframe}_{slot}$ and $N^{frame}_{slot}$ according to each subcarrier spacing configuration μ may be defined as shown below in Table 1.

TABLE 1

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
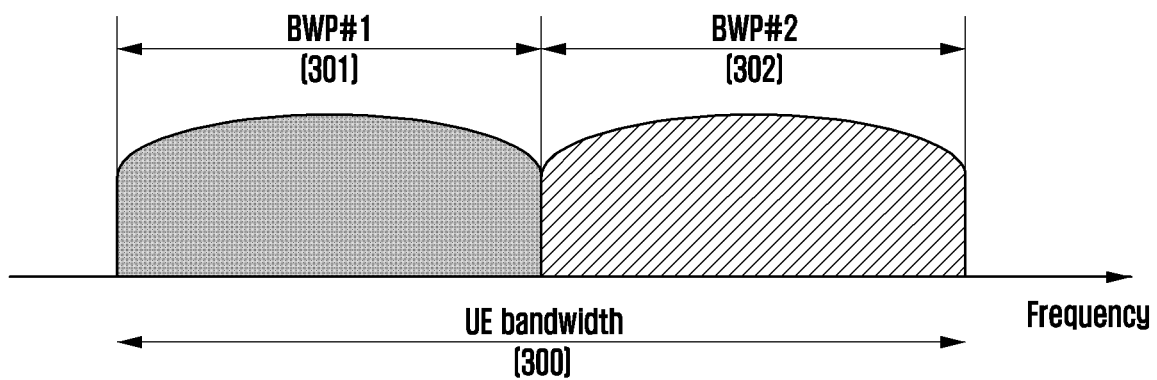
FIG. 3 illustrates a BWP configuration in 5G according to an embodiment.

FIG. 3 illustrates a configuration of a BWP in a 5G communication system according to an embodiment.

Referring to FIG. 3, a terminal bandwidth 300 is configured to be divided into two BWPs, BWP #1 301 and BWP #2 302. A base station may configure one BWP or a plurality of BWPs for a terminal and may configure information shown in Table 2 below for each BWP.

TABLE 2

| |
|---|
| BWP ::=             SEQUENCE { |
| bwp-Id                            BWP-Id, |
|     (bandwidth part identifier) |
| locationAndBandwidth     INTEGER (1..65536), |
|     (bandwidth part location) |
| subcarrierSpacing           ENUMERATED {n0, n1, n2, n3, n4, n5}, |
|     (subcarrier spacing) |
| cyclicPrefix                    ENUMERATED { extended } |
|     (cyclic prefix) |
| } |

In addition to the configuration information described above, various parameters related to a BWP may be configured for the terminal. The information may be transferred by the base station to the terminal through higher layer signaling, e.g., radio resource control (RRC) signaling. At least one BWP among the configured one BWP or plurality of BWPs may be activated. Whether the configured BWP is activated may be semi-statically transferred from the base station to the terminal through RRC signaling, or dynamically transferred through DCI.

An initial BWP for an initial access may be configured for the terminal before an RRC connection by the base station through a master information block (MIB). More specifically, a terminal may receive control information relating to a CORESET and a search space, in which a physical downlink control channel (PDCCH) can be transmitted, the PDCCH being designed for the terminal to receive system information for an initial access through an MIB in an initial access stage. For example, system information for an initial access may correspond to remaining system information (RMSI) or system information block 1 (SIB1).

A CORESET and a search space that are configured through an MIB may be assumed to be identifiers (IDs) 0. The base station may notify the terminal of configuration information such as frequency allocation information, time allocation information, and numerology for CORESET #0 through an MIB. In addition, the base station may notify the terminal of configuration information relating to a monitoring period and occasion for CORESET #0, i.e., configuration information for CORESET #0, through an MIB. The terminal may consider a frequency region configured to be CORESET #0 obtained from an MIB, as an initial BWP for an initial access. The ID of the initial BWP may be 0.

The BWP configuration supported by 5G may be used for various purposes.

For example, if a bandwidth supported by the terminal is smaller than a system bandwidth, the terminal may be supported through the BWP configuration. The frequency location (configuration information 2) of a BWP may be configured for the terminal so that the terminal transmits or receives data at a particular frequency location in a system bandwidth.

As another example, the base station may configure a plurality of BWPs for a terminal in order to support different numerologies. In order to support, to a terminal, both data transmission/reception using a subcarrier spacing of 15 KHz and data transmission/reception using a subcarrier spacing of 30 KHz, the base station may configure, for the terminal, two BWPs having a subcarrier spacing of 15 KHz and a subcarrier spacing of 30 KHz, respectively. Different BWPs may undergo frequency division multiplexing, and if the terminal and the base station are to transmit or receive data using a particular subcarrier spacing, a BWP configured to have the subcarrier spacing may be activated.

As another example, the base station may configure BWPs having different bandwidths for the terminal in order to reduce the power consumption of the terminal. If the terminal supports a very wide bandwidth, such as 100 MHz, and always transmits or receives data through the bandwidth, the terminal may consume a very large quantity of power. Particularly, unnecessary monitoring of a DL control channel in a large bandwidth of 100 MHz under no traffic is very inefficient in view of power consumption. In order to reduce the power consumption of a terminal, the base station may configure a BWP having a relatively small bandwidth, such as 20 MHz, for the terminal. If there is no traffic, the terminal may monitor a 20 MHz BWP, and if data is generated, the terminal may transmit or receive the data through a 100 MHz BWP according to an indication of the base station.

In relation to a method for configuring a BWP described above, terminals, before being RRC-connected, may receive configuration information of an initial BWP through an MIB in an initial access stage. A CORESET for a DL control channel through which DCI scheduling an SIB may be transmitted may be configured for the terminal through an MIB of a physical broadcast channel (PBCH). The bandwidth of the CORESET configured by the MIB may be considered as an initial BWP, and the terminal may receive a physical downlink shared channel (PDSCH) through which the SIB is transmitted, through the configured initial BWP. In addition to the reception of an SIB, an initial BWP may be used for other system information (OSI), paging, and random access.

If one or more BWPs are configured for the terminal, the base station may instruct the terminal to change a BWP, by using a BWP indicator field in the DCI. For example, referring again to FIG. 3, if a currently activated BWP of the terminal is BWP #1 301, the base station may indicate BWP #2 302 to the terminal through a BWP indicator in the DCI, and the terminal may change the BWP to BWP #2 302 as indicated by the BWP indicator in the received DCI.

In a wireless communication system supporting frequency division duplexing (FDD), change of a UL BWP may be indicated by DCI (e.g., DCI format 0_1) scheduling UL data transmitted through a physical uplink shared channel (PUSCH), and change of a DL BWP may be indicated by DCI (e.g. DCI format 1_1) scheduling DL data received through a PDSCH.

In a wireless communication system supporting time division duplexing (TDD), a UL BWP and a DL BWP having the same BWP index may be related, and both the UL BWP and the DL BWP may be changed by a BWP indicator indicated by DCI (e.g., a DCI format 0_1 or 1_1) scheduling a PUSCH or a PDSCH. For example, if a currently activated BWP is BWP #1, BWP #1 is activated in both UL/DL BWPs in TDD. If a change to BWP #2 is indicated by DCI format 0_1(or 1_1), the terminal may change both the UL/DL BWPs to BWPs #2.

As described above, a BWP change based on DCI may be indicated by DCI scheduling a PDSCH or a PUSCH. After a terminal receives a BWP change request, the terminal should transmit or receive the PDSCH or PUSCH scheduled by the DCI in a changed BWP within a certain time frame. To this end, a standard prescribes a requirement for a latency time interval ($T_{BWP}$) required for a BWP change, and the requirements may be defined, e.g., as shown below in Table 3. The requirements for BWP change latency time interval may support type 1 or type 2 according to the capability of the terminal. The terminal may report a supportable type of BWP latency time interval to the base station.

TABLE 3

| | NR Slot length | BWP switch delay $T_{BWP}$ (slots) | |
| --- | --- | --- | --- |
| μ | (ms) | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of subcarrier spacing (SCS), the BWP switch delay is determined by the larger one between the SCS before BWP switch and the SCS after BWP switch.

According to the above requirements for BWP change latency time interval, if the terminal receives DCI including a BWP change indicator in slot n, the terminal should complete changing to a new BWP indicated by the BWP change indicator no later than slot $n+T_{BWP}$, and transmit or receive a data channel scheduled by the DCI in the new BWP.

If the base station is to schedule a data channel in a new BWP, the base station may determine time domain resource allocation for the data channel in consideration of a BWP change latency time interval of the terminal. That is, in a method of determining time domain resource allocation for a data channel, when the base station schedules the data channel in a new BWP, the data channel may be scheduled after a BWP change latency time interval.

In a 5G system, scheduling information on UL data (or a physical UL data channel (e.g., a PUSCH)) or DL data (or a physical DL data channel (e.g., a PDSCH)) may be transferred through DCI from a base station to a terminal. The terminal may monitor a fallback DCI format and a non-fallback DCI format for a PUSCH or a PDSCH. The fallback DCI format may be configured by a field predefined between a base station and a terminal, and the non-fallback DCI format may include a configurable field.

The DCI may undergo a channel coding and modulation process, and then be transmitted through a PDCCH. A cyclic redundancy check (CRC) is attached to a payload of a DCI message, and the CRC is scrambled by a radio network temporary identifier (RNTI) corresponding to the terminal ID. Different types of RNTIs may be used according to the purpose of a DCI message, e.g., UE-specific data transmission, a power control command, a random access response, etc. That is, an RNTI is not explicitly transmitted, and is transmitted after being included in a CRC calculation process. If the terminal has received a DCI message transmitted on a PDCCH, the terminal may identify a CRC by using an assigned RNTI. If a CRC identification result is correct, the terminal may identify that the message has been transmitted to the terminal. For example, DCI scheduling a PDSCH for system information (SI) may be scrambled by an SI-RNTI. DCI scheduling a PDSCH for a random access response (RAR) message may be scrambled by a random access (RA)-RNTI (RA-RNTI). DCI scheduling a PDSCH for a paging (P) message may be scrambled by a P-RNTI. DCI notifying of a slot format indicator (SFI) may be scrambled by an SFI-RNTI. DCI notifying of a transmit power control (TPC) may be scrambled by a TPC-RNTI. DCI scheduling a UE-specific PDSCH or PUSCH may be scrambled by a cell (C)-RNTI (C-RNTI).

DCI format 0_0 may be used for fallback DCI scheduling a PUSCH, and a CRC may be scrambled by a C-RNTI. DCI format 0_0 having a CRC scrambled by a C-RNTI may include information as shown below in Table 4.

TABLE 4

- Identifier for DCI formats (DCI format identifier)- [1] bit
- Frequency domain resource assignment - $\lceil \log_2(N_{RB}^{UL,BWP}(N_{RB}^{UL,BWP}+1)/2) \rceil$ bits
- Time domain resource assignment - X bits
- Frequency hopping flag - 1 bit.
- Modulation and coding scheme - 5 bits
- New data indicator - 1 bit
- Redundancy version - 2 bits
- Hybrid automatic repeat request (HARQ) process number - 4 bits
- TPC command for scheduled PUSCH (wherein TPC indicates transmit power control) - 2 bits
- UL/supplementary uplink (SUL) indicator - 0 or 1 bit DCI format 0_1 may be used for non-fallback DCI scheduling a PUSCH, and a CRC may be scrambled by a C-RNTI. DCI format 0_1 having a CRC scrambled by a C-RNTI may include information as shown below in Table 5.

TABLE 5

- Identifier for DCI formats - 1 bits
- Carrier indicator - 0 or 3 bits
- UL/SUL indicator - 0 or 1 bit
- BWP indicator - 0, 1 or 2 bits
- Frequency domain resource assignment
  • For resource allocation type 0, $\lceil N_{RB}^{UL,BWP} / P \rceil$ bits
  • For resource allocation type 1, $\lceil \log_2(N_{RB}^{UL,BWP}(N_{RB}^{UL,BWP}+1)/2) \rceil$ bits
- Time domain resource assignment -1, 2, 3, or 4 bits
- Frequency hopping flag - 0 or 1 bit, only for resource allocation type 1.
  • 0 bit if only resource allocation type 0 is configured;
  • 1 bit otherwise.
- Modulation and coding scheme - 5 bits
- New data indicator - 1 bit
- Redundancy version - 2 bits
- HARQ process number - 4 bits
- 1st DL assignment index - 1 or 2 bits
  • 1 bit for semi-static HARQ-acknowledgement (ACK) codebook;
  • 2 bits for dynamic HARQ-ACK codebook with single HARQ-ACK codebook.
- 2nd DL assignment index - 0 or 2 bits
  • 2 bits for dynamic HARQ-ACK codebook with two HARQ-ACK sub-codebooks;
  • 0 bit otherwise.
- TPC command for scheduled PUSCH - 2 bits
- Sounding reference signal (SRS) resource indicator - $\left\lceil \log_2\left(\sum_{k=1}^{L_{max}} \binom{N_{SRS}}{k}\right) \right\rceil$ or $\lceil \log_2(N_{SRS}) \rceil$ bits
  • $\left\lceil \log_2\left(\sum_{k=1}^{L_{max}} \binom{N_{SRS}}{k}\right) \right\rceil$ bits for non-codebook based PUSCH transmission (if PUSCH transmission is not based on codebook);
  • $\lceil \log_2(N_{SRS}) \rceil$ bits for codebook based PUSCH transmission (if PUSCH transmission is based on codebook).
- Precoding information and number of layers -up to 6 bits TABLE 5-continued

- Antenna ports - up to 5 bits
- SRS request - 2 bits
- Channel state information (CSI) request - 0, 1, 2, 3, 4, 5, or 6 bits
- Code block group (CBG) transmission information - 0, 2, 4, 6, or 8 bits
- Phase tracking reference signal-demodulation reference signal (PTRS-DMRS) - 0 or 2 bits.
- beta_offset indicator - 0 or 2 bits TABLE 5-continued

- DMRS sequence initialization - 0 or 1 bit
- UL-SCH indicator – 1 bit

DCI format 1_0 may be used for fallback DCI scheduling a PDSCH, and a CRC may be scrambled by a C-RNTI. DCI format 1_0 having a CRC scrambled by a C-RNTI may include information as shown below in Table 6.

TABLE 6

- Identifier for DCI formats - 1 bit
- Frequency domain resource assignment - $[\lceil \log_2(N_{RB}^{DL,BWP}(N_{RB}^{DL,BWP}+1)/2) \rceil]$ bits
- Time domain resource assignment - X bits
- Virtual resource block (VRB)-to-physical resource block (PRB) mapping - 1 bit.
- Modulation and coding scheme - 5 bits
- New data indicator - 1 bit
- Redundancy version - 2 bits
- HARQ process number - 4 bits
- DL assignment index - 2 bits
- TPC command for scheduled physical uplink control channel (PUCCH) - 2 bits
- PUCCH resource indicator - 3 bits
- PDSCH-to-HARQ feedback timing indicator - 3 bits DCI format 1_1 may be used for non-fallback DCI scheduling a PDSCH, and a CRC may be scrambled by a C-RNTI. DCI format 1_1 having a CRC scrambled by a C-RNTI may include information as shown below in Table 7.

TABLE 7

Figure 4:
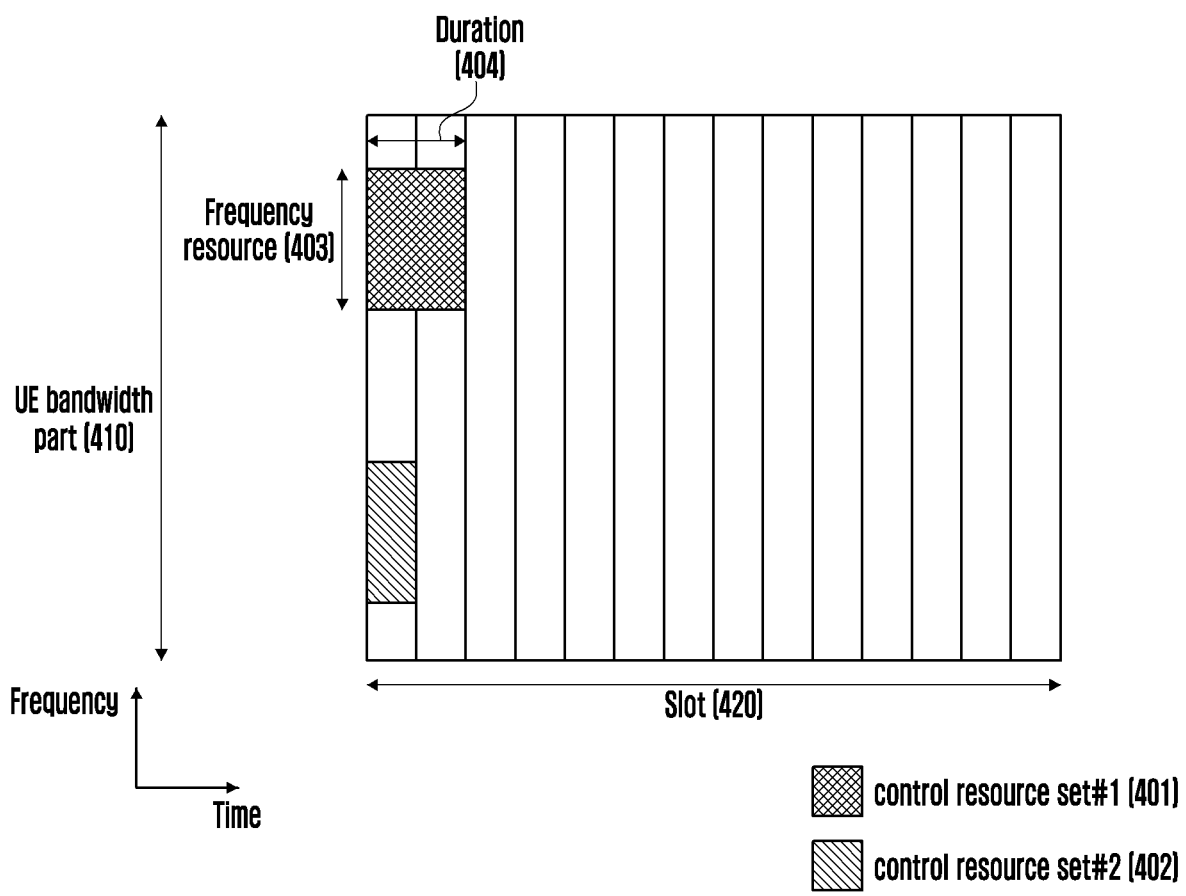
FIG. 4 illustrates a control resource set (CORESET) configuration of a downlink (DL) control channel in 5G according to an embodiment.

- Identifier for DCI formats - 1 bits
- Carrier indicator - 0 or 3 bits
- BWP indicator - 0, 1 or 2 bits
- Frequency domain resource assignment
  · If resource allocation type 0 is configured, $N_{RBG}$ bits
  · If resource allocation type 1 is configured, $[\lceil \log_2(N_{RB}^{DL,BWP}(N_{RB}^{DL,BWP}+1)/2) \rceil]$ bits
  · If both resource allocation type 0 and 1 is configured, $\max(\lceil \log_2(N_{RB}^{DL,BWP}(N_{RB}^{DL,BWP}+1)/2 \rceil, N_{RBG})+1$ bits
- Time domain resource assignment -1, 2, 3, or 4 bits
- VRB-to-PRB mapping - 0 or 1 bit, only for resource allocation type 1.
  · 0 bit if only resource allocation type 0 is configured;
  · 1 bit otherwise.
- PRB bundling size indicator (wherein PRB indicates) - 0 or 1 bit
- Rate matching indicator - 0, 1, or 2 bits
- Zero power (ZP) CSI-reference signal (RS) trigger - 0, 1, or 2 bits For transport block 1:
- Modulation and coding scheme - 5 bits
- New data indicator - 1 bit
- Redundancy version - 2 bits For transport block 2:
- Modulation and coding scheme - 5 bits
- New data indicator - 1 bit
- Redundancy version - 2 bits
- HARQ process number - 4 bits
- DL assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna, ports - 4, 5 or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit FIG. 4 illustrates a CORESET on which a DL control channel is transmitted in a 5G wireless communication system according to an embodiment.

Referring to FIG. 4, a BWP 410 of a terminal is configured along a frequency axis and two CORESETs (CORESET #1 401 and CORESET #2 402) are configured in one slot 420 along a time axis. The CORESETs 401 and 402 may be configured on a particular frequency resource 403 in the entire terminal BWP 410 along the frequency axis. The CORESETs 401 and 402 may be configured by one OFDM symbol or a plurality of OFDM symbols along the time axis, and the configured OFDM symbol or symbols may be defined as a CORESET duration 404. In FIG. 4, CORESET #1 401 is configured to have a CORESET duration of two symbols, and CORESET #2 402 is configured to have a CORESET duration of one symbol.

A CORESET in 5G, described above may be configured for a terminal by a base station through higher layer signaling (e.g. system information, MIB, and RRC signaling). Configuring of a CORESET for a terminal includes providing information such as a CORESET identity, the frequency location of the CORESET, the symbol length of the CORESET, etc. For example, the information may include information as shown below in Table 8.

subcarriers. The REGs 503 may be connected to each other to configure a DL control channel assignment unit.

If a basic unit for the assignment of a DL control channel in 5G technology is a control channel element (CCE) 504, one CCE 504 may be configured by a plurality of the REGs 503. The REG 503 may be configured by 12 REs, one CCE 504 may be configured by six REGs 503, and the one CCE 504 may be configured by 72 REs. If a DL CORESET is configured, the resource set may be configured by a plurality of CCEs 504. A particular DL control channel may be transmitted after being mapped to one CCE 504 or a plurality of CCEs 504 according to an aggregation level (AL) in the CORESET. CCEs 504 in a CORESET are distinguished by numbers, and the numbers may be assigned according to a logical mapping scheme.

Figure 5:
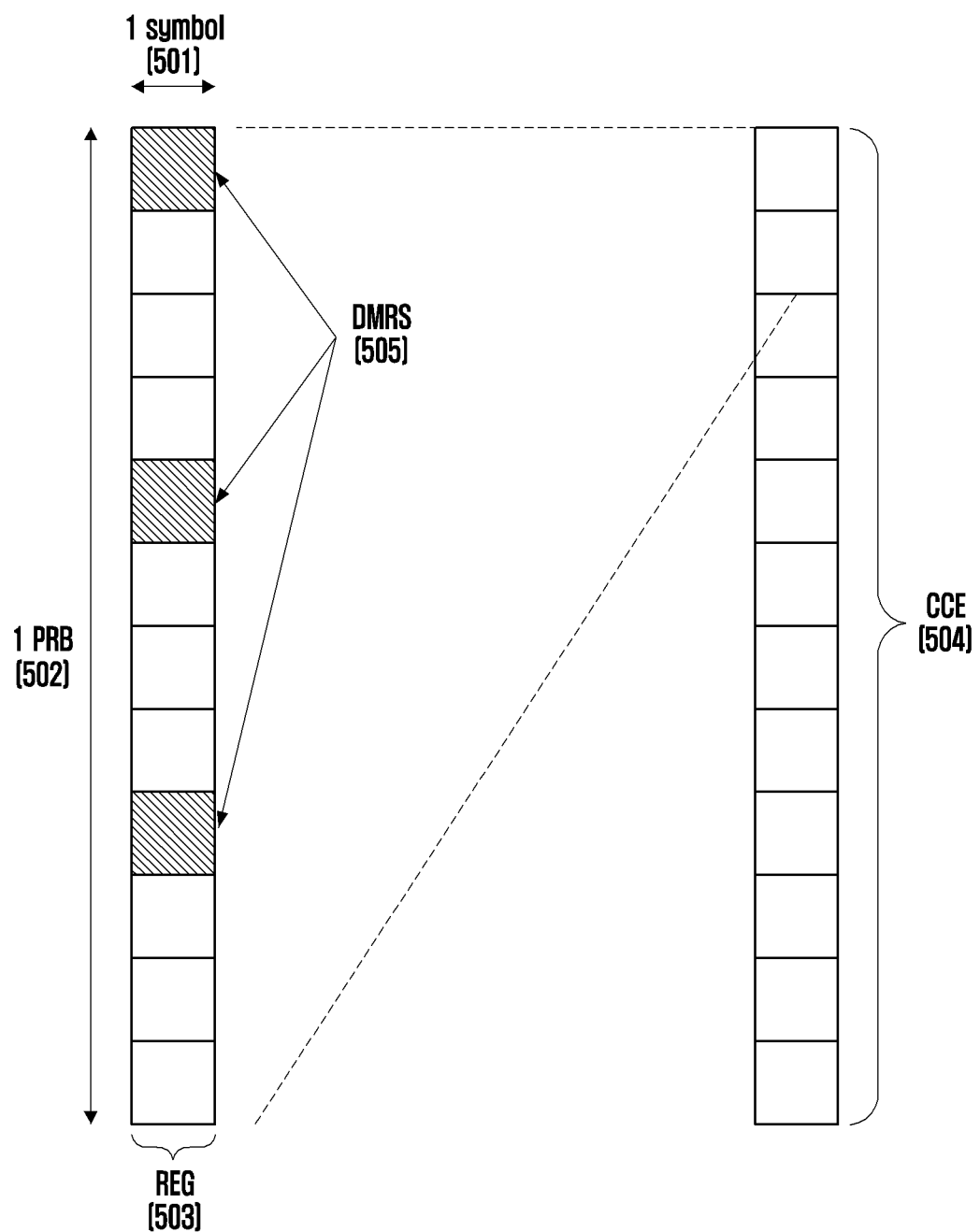
FIG. 5 illustrates a basic unit structure for time and frequency resources of a DL control channel in 5G according to an embodiment.

The REG 503 may include REs to which DCI is mapped and a region to which a DMRS 505, which is a reference signal for decoding the REs, is mapped. In FIG. 5, three DMRSs 505 are transmitted in one REG 503 as an example.

The number of CCEs required for transmitting a PDCCH may be 1, 2, 4, 8, and 16 according to ALs, and different numbers of CCEs may be used to implement the link adaptation of the DL control channel. For example, if AL=L, one DL control channel may be transmitted through L

TABLE 8

```
ControlResourceSet ::=            SEQUENCE {
-- Corresponds to L1 parameter 'CORESET-ID'
controlResourceSetId              ControlResourceSetId,
(control resource set identifier(Identity))
frequencyDomainResources          BIT STRING (SIZE (45)),
(frequency axis resource assignment information)
duration                          INTEGER (1..maxCoReSetDuration),
(time axis resource assignment information)
cce-REG-MappingType               CHOICE {
(CCE-to-REG mapping scheme)
   interleaved                    SEQUENCE {
      reg-BundleSize              ENUMERATED {n2, n3, n6},
      (REG bundle size)
      precoderGranularity         ENUMERATED {sameAsREG-
bundle, allContiguousRBs},
      interleaverSize             ENUMERATED {n2, n3, n6}
      (interleaver size)
      shiftIndex
   INTEGER(0..maxNrofPhysicalResourceBlocks-1)
   OPTIONAL
      (interleaver shift)
   },
   nonInterleaved                 NULL
},
tci-StatesPDCCH                   SEQUENCE(SIZE   (1..maxNrofTCI-
StatesPDCCH)) OF TCI-StateId                     OPTIONAL,
(Quasi-co-location (QCL) configuration information)
tci-PresentInDCI                  ENUMERATED {enabled}
}
```

In Table 8, tci-StatesPDCCH (simply referred to as a TCI state) configuration information may include information on the index or indices of one or multiple synchronization signal(SS)/PBCH blocks having a quasi-co-located (QCL) relationship with a demodulation reference signal (DMRS) transmitted on a corresponding CORESET, or information on the index of a CSI reference signal (CSI-RS).

FIG. 5 illustrates a basic unit structure of time and frequency resources of a DL control channel in 5G according to an embodiment.

Referring to FIG. 5, a basic unit of time and frequency resources of a control channel is a resource element group (REG) 503, and the REG 503 may be defined as one OFDM symbol 501 in a time axis and one physical resource block (PRB) 502 in a frequency axis, i.e., may be defined as 12 number of CCEs. A terminal should detect a signal while the terminal does not know information relating to a DL control channel, and a search space indicating a set of CCEs is defined for blind decoding. A search space is a set of DL control channel candidates configured by CCEs to which the terminal is required to attempt to decode at a given AL, and because there are various ALs grouping 1, 2, 4, 8, and 16 CCEs into one, respectively, the terminal has a plurality of search spaces. A search space set may be defined at all of the configured ALs.

A search space may be classified as a common search space and a UE-specific search space. A group of terminals or all the terminals may investigate a common search space for a PDCCH in order to receive cell-common control information such as a paging message or dynamic scheduling for system information. For example, the terminals may investigate a common search space for a PDCCH to receive PDSCH scheduling assignment information for transmission of an SIB including cell operator information. For a common search space, a particular group of terminals or all the terminals are required to receive a PDCCH, and thus the common search space may include a pre-determined set of CCEs.

The terminals may investigate a UE-specific search space for a PDCCH in order to receive scheduling assignment information for a UE-specific PDSCH or PUSCH. A UE-specific search space may be defined for a specific UE by using the identity of the UE and the functions of various system parameters.

In 5G, a parameter for a search space for a PDCCH may be configured for a terminal by a base station through higher layer signaling (e.g., an SIB, an MIB, and RRC signaling). For example, the base station may configure, for the terminal, the number of PDCCH candidates at each AL L, a monitoring period for a search space, a monitoring occasion in the units of symbols in a slot of a search space, a search space type (i.e., a common search space or a UE-specific search space), a combination of an RNTI and a DCI format to be monitored in a corresponding search space, and an index of a CORESET in which a search space is to be monitored. The configured information may include information as shown below in Table 9.

TABLE 9

```
Searchspace ::=                          SEQUENCE {
  -- Identity of the search space. SearchSpaceId = 0 identifies the SearchSpace
configured via PBCH (MIB) or ServingCellConfigCommon.
    searchSpaceId                        SearchSpaceId,
    (search space identifier)
    controlResourceSetId                 ControlResourceSetId,
    (control resource set identifier)
    monitoringSlotPeriodicityAndOffset   CHOICE {
    (monitoring slot level period)
      sl1                                NULL,
      sl2                                INTEGER (0..1),
      sl4                                INTEGER (0..3),
      sl5                                INTEGER (0..4),
      sl8                                INTEGER (0..7),
      sl10                               INTEGER (0..9),
      sl16                               INTEGER (0..15),
      sl20                               INTEGER (0..19)
    }
    monitoringSymbolsWithinSlot              BIT STRING (SIZE (14))
    (monitoring symbols in slot)
    nrofCandidates                       SEQUENCE {
    (the number of PDCCH candidates for each aggregation level)
      aggregationLevel1                  ENUMERATED {n0, n1, n2, n3, n4, n5, n6, n8},
      aggregationLevel 2                 ENUMERATED {n0, n1, n2, n3, n4, n5, n6, n8},
      aggregationLevel4                  ENUMERATED {n0, n1, n2, n3, n4, n5, n6, n8},
      aggregationLevel8                  ENUMERATED {n0, n1, n2, n3, n4, n5, n6, n8},
      aggregationLevel16                 ENUMERATED {n0, n1, n2, n3, n4, n5, n6, n8}
    }
    searchSpaceType                      CHOICE {
    (search space type)
    -- Configures this search space as common search space (CSS) and DCI
formats to monitor.
      common                             SEQUENCE {
      (common search space)
      }
      ue-Specific                        SEQUENCE {
      (UE-specific search space)
        --Indicates whether the UE monitors in this UE-specific search space
(USS) for DCI formats 0-0 and 1-0 or for formats 0-1 and 1-1.
        formats                          ENUMERATED {formats0-0-And-1-0, formats0-1-And-1-1},
        ...
      }
}
```

The base station may configure one search space set or a plurality of search space sets for the terminal according to the configuration information. The base station may configure, for the terminal, search space set 1 and search space set 2, in search space set 1, DCI format A scrambled by X-RNTI may be configured to be monitored in a common search space, and in search space set 2, DCI format B scrambled by Y-RNTI may be configured to be monitored in a UE-specific search space.

According to the configuration information, one search space set or a plurality of search space sets may exist in a common search space or a UE-specific search space. Search space set #1 and search space set #2 may be configured to be common search spaces, and search space set #3 and search space set #4 may be configured to be UE-specific search spaces.

In a common search space, combinations of a DCI format and an RNTI as below may be monitored.

DCI format 0_0/1_0 with CRC scrambled by C-RNTI, Configured Scheduling RNTI (CS-RNTI), Semi-Persistent (SP)-CSI-RNTI, RA-RNTI, Temporary Cell RNTI (TC-RNTI), P-RNTI, or SI-RNTI DCI format 2_0 with CRC scrambled by SFI-RNTI DCI format 2_1 with CRC scrambled by Interruption RNTI (INT-RNTI)

DCI format 2_2 with CRC scrambled by Transmit Power Control for PUSCH RNTI (TPC-PUSCH-RNTI, or Transmit Power Control for PUCCH RNTI (TPC-PUCCH-RNTI)

DCI format 2_3 with CRC scrambled by Transmit Power Control for SRS RNTI (TPC-SRS-RNTI)

In a UE-specific search space, combinations of a DCI format and an RNTI as shown below may be monitored.

DCI format 0_0/1_0 with CRC scrambled by C-RNTI, CS-RNTI, or TC-RNTI

DCI format 1_0/1_1 with CRC scrambled by C-RNTI, CS-RNTI, or TC-RNTI

The described types of RNTIs may follow the definitions below.

C-RNTI: for scheduling a UE-specific PDSCH

TC-RNTI: for scheduling a UE-specific PDSCH

CS-RNTI: for scheduling semi-statically configured UE-specific PDSCH/PUSCH

RA-RNTI: for scheduling a PDSCH in a random access stage

P-RNTI: for scheduling a PDSCH on which paging is transmitted

SI-RNTI: for scheduling a PDSCH on which system information is transmitted

INT-RNTI: for notifying of whether a PDSCH is punctured

TPC-PUSCH-RNTI: for indicating a power control command for a PUSCH

TPC-PUCCH-RNTI: for indicating a power control command for a PUCCH

TPC-SRS-RNTI: for indicating a power control command for an SRS

The described DCI formats may follow the definitions shown below in Table 10.

TABLE 10

| DCI format | Usage |
|---|---|
| 0_0 | Scheduling of a PUSCH in one cell |
| 0_1 | Scheduling of a PUSCH in one cell |
| 1_0 | Scheduling of a PDSCH in one cell |
| 1_1 | Scheduling of a PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for a PUCCH and a PUSCH |
| 2_3 | Transmission of a group of TPC commands for SRS transmissions by one or more UEs |

A base station may configure, for a terminal, time domain resource allocation information (e.g., a table) for a DL data channel (e.g., a PDSCH) and a uplink data channel (e.g., a PUSCH) through higher layer signaling (e.g., RRC signaling). The base station may configure, for a PDSCH, a table configured by a maximum of 16 entries (maxNrofDL-Allocations=16), and may configure, for a PUSCH, a table configured by a maximum of 16 entries (maxNrofUL-Allocations=16). Time domain resource allocation (TD-RA) information may include PDCCH-to-PDSCH slot timing (i.e., a time gap in units of slots, between a time point at which a PDCCH is received, and a time point at which a PDSCH scheduled by the received PDCCH is transmitted, e.g., the timing is indicated by K0) or PDCCH-to-PUSCH slot timing (i.e., a time gap in units of slots, between a time point at which a PDCCH is received, and a time point at which a PUSCH scheduled by the received PDCCH is transmitted, e.g., the timing is indicated by $K_2$), information relating to the location of a starting symbol of a PDSCH or a PUSCH scheduled in a slot, and the scheduled length, a mapping type of a PDSCH or a PUSCH, etc. A terminal may be notified, by a base station, of the information as shown in Tables 11 and 12 below.

TABLE 11

PDSCH-TimeDomainResourceAllocationList information element

PDSCH-TimeDomainResourceAllocationList ::= SEQUENCE (SIZE(1..maxNrofUL-Allocations)) OF PDSCH-TimeDomainResourceAllocation
PDSCH-TimeDomainResourceAllocation ::= SEQUENCE {
  k0                                            INTEGER(0..32) OPTIONAL, -- Need S
  (PDCCH-to-PDSCH timing in units of slots)
  mappingType                ENUMERATED {typeA, typeB},
  (PDSCH mapping type)
  startSymbolAndLength         INTEGER (0..127)
  (The length and a starting symbol of a PDSCH)
}

TABLE 12

PUSCH-TimeDomainResourceAllocation information element

PUSCH-TimeDomainResourceAllocationList ::= SEQUENCE (SIZE(1..maxNrofUL-Allocations) ) OF PUSCH-TimeDomainResourceAllocation
PUSCH-TimeDomainResourceAllocation ::= SEQUENCE {
  k2                               INTEGER(0..32)        OPTIONAL, - - Need S
  (PDCCH-to-PUSCH timing in units of slots)
  mappingType                ENUMERATED {typeA, typeB},
  (PUSCH mapping type)

TABLE 12-continued

PUSCH-TimeDomainResourceAllocation information element startSymbolAndLength               INTEGER (0..127)
(The length and a starting symbol of a PUSCH)
}

The base station may notify the terminal of one of the entries of the table relating to the time domain resource allocation information through L1 signaling (e.g., DCI). The base station may indicate one of the entries to the terminal through a time domain resource allocation field in DCI. The terminal may obtain time domain resource allocation information relating to a PDSCH or PUSCH, based on DCI received from the base station.

CSI may include a channel quality indicator (e.g., channel quality information (CQI)), a precoding matrix index (PMI), a CSI-RS resource indicator (CRI), an SS/PBCH block resource indicator (SSBRI), a layer indicator (LI), a rank indicator (RI), and/or an L1-reference signal received power (RSRP). A base station may control time and frequency resources for measuring and reporting the above CSI of a terminal.

In order to measure and report of the CSI, N(≥1) setting information (CSI-ReportConfig) for CSI reporting, M(≥1) configuration information (CSI-ResourceConfig) for a RS transmission resource, and one or two trigger state (CSI-AperiodicTriggerStateList, CSI-SemiPersistentOnPUSCH-TriggerStateList) list information may be configured for the terminal through higher layer signaling.

The above-described configuration information for CSI measurement and reporting may be the information as shown below in Tables 13 to 19.

Table 13 illustrates a CSI-ReportConfig information element (IE) that is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included, in this case the cell on which the report is sent is determined by the received DCI).

TABLE 13

CSI-ReportConfig Information element

-- ASN1START
-- TAG-CSI-REPORTCONFIG-START
CSI-ReportConfig ::=                    SEQUENCE {
    reportConfigId                      CSI-ReportConfigId,
    carrier                                          ServCellIndex
OPTIONAL,   -- Need S
    resourcesForChannelMeasurement       CSI-ResourceConfigId,
    csi-IM-ResourcesForInterference                  CSI-ResourceConfigId
OPTIONAL,   -- Need R
    nzp-CSI-RS-ResourcesForInterference              CSI-ResourceConfigId
OPTIONAL,   -- Need R
    reportConfigType                    CHOICE {
        periodic                        SEQUENCE {
            reportSlotConfig                         CSI-
ReportPeriodicityAndOffset,
            pucch-CSI-ResourceList                   SEQUENCE (SIZE
(1..maxNrofBWPs)) OF PUCCH-CSI-Resource
        },
        semiPersistentOnPUCCH           SEQUENCE {
            reportSlotConfig                         CSI-
ReportPeriodicityAndOffset,
            pucch-CSI-ResourceList                   SEQUENCE (SIZE
(1..maxNrofBWPs)) OF PUCCH-CSI-Resource
        },
        semiPersistentOnPUSCH           SEQUENCE {
            reportSlotConfig                         ENUMERATED {s15, s110,
s120, s140, s180, s1160, s1320},
            reportSlotOffsetList                     SEQUENCE (SIZE (1..
maxNrofUL-Allocations)) OF INTEGER(0..32),
            p0alpha                     P0-PUSCH-AlphaSetId
        },
        aperiodic                       SEQUENCE {
            reportSlotOffsetList                     SEQUENCE (SIZE
(1..maxNrofUL-Allocations)) OF INTEGER(0..32)
        }
    },
    reportQuantity                      CHOICE {
        none                            NULL,
        cri-RI-PMI-CQI                  NULL,
        cri-RI-i1                       NULL,
        cri-RI-i1-CQI                   SEQUENCE {
            pdsch-BundleSizeForCSI                   ENUMERATED {n2, n4}
OPTIONAL   -- Need S
        },
        cri-RI-CQI                      NULL, TABLE 13-continued

| CSI-ReportConfig Information element | |
|---|---|
| cri-RSRP | NULL, |
| ssb-Index-RSRP | NULL, |
| cri-RI-LI-PMI-CQI | NULL |
| }, | |
| reportFreqConfiguration | SEQUENCE { |
| cqi-FormatIndicator | ENUMERATED { widebandCQI, |
| subbandCQI } | OPTIONAL, -- Need R |
| pmi-FormatIndicator | ENUMERATED { widebandPMI, |
| subbandPMI } | OPTIONAL, -- Need R |
| csi-ReportingBand | CHOICE { |
| subbands3 | BIT STRING(SIZE(3)), |
| subbands4 | BIT STRING(SIZE(4)), |
| subbands5 | BIT STRING(SIZE(5)), |
| subbands6 | BIT STRING(SIZE(6)), |
| subbands7 | BIT STRING(SIZE(7)), |
| subbands8 | BIT STRING(SIZE(8)), |
| subbands9 | BIT STRING(SIZE(9)), |
| subbands10 | BIT STRING(SIZE(10)), |
| subbands11 | BIT STRING(SIZE(11)), |
| subbands12 | BIT STRING(SIZE(12)), |
| subbands13 | BIT STRING(SIZE(13)), |
| subbands14 | BIT STRING(SIZE(14)), |
| subbands15 | BIT STRING(SIZE(15)), |
| subbands16 | BIT STRING(SIZE(16)) , |
| subbands17 | BIT STRING(SIZE(17)), |
| subbands18 | BIT STRING(SIZE(18)), |
| ..., | |
| subbands19-v1530 | BIT STRING(SIZE(19)) |
| } OPTIONAL -- Need S | |
| } | |
| OPTIONAL, -- Need R | |
| timeRestrictionForChannelMeasurements | ENUMERATED |
| {configured, notConfigured}, | |
| timeRestrictionForInterferenceMeasurements | ENUMERATED |
| {configured, notConfigured}, | |
| codebookConfig | CodebookConfig |
| OPTIONAL, -- Need R | |
| dummy | ENUMERATED {n1, n2} |
| OPTIONAL, -- Need R | |
| groupBasedBeamReporting | CHOICE { |
| enabled | NULL, |
| disabled | SEQUENCE { |
| nrofReportedRS | ENUMERATED {n1, n2, n3, |
| n4} | OPTIONAL -- Need S |
| } | |
| }, | |
| cqi-Table | ENUMERATED {table1, table2, table3, |
| spare1} | OPTIONAL, -- Need R |
| subbandSize | ENUMERATED {value1, value2}, |
| non-PMI-PortIndication | SEQUENCE (SIZE (1..maxNrofNZP- |
| CSI-RS-ResourcesPerConfig)) OF PortIndexFor8Ranks | OPTIONAL, -- Need R |
| ..., | |
| [[ | |
| semiPersistentOnPUSCH-v1530 | SEQUENCE { |
| reportSlotConfig-v1530 | ENUMERATED {s14, s18, s116} |
| } | |
| OPTIONAL -- Need R | |
| ]] | |
| } | |
| CSI-ReportPeriodicityAndOffset ::= CHOICE { | |
| slots4 | INTEGER(0..3), |
| slots5 | INTEGER(0..4), |
| slots8 | INTEGER(0..7), |
| slots10 | INTEGER(0..9), |
| slots16 | INTEGER(0..15), |
| slots20 | INTEGER(0..19), |
| slots40 | INTEGER(0..39), |
| slots80 | INTEGER(0..79), |
| slots160 | INTEGER(0..159), |
| slots320 | INTEGER(0..319) |
| } | |
| PUCCH-CSI-Resource ::= | SEQUENCE { |
| uplinkBandwidthPartId | BWP-Id, |
| pucch-Resource | PUCCH-ResourceId |
| } | |
| PortIndexFor8Ranks ::= | CHOICE { |
| portIndex8 | SEQUENCE{ |
| rank1-8 | PortIndex8 |

TABLE 13-continued

CSI-ReportConfig Information element

```
            OPTIONAL,   -- Need R
        rank2-8                         SEQUENCE(SIZE(2)) OF PortIndex8
            OPTIONAL,   -- Need R
        rank3-8                         SEQUENCE(SIZE(3)) OF PortIndex8
            OPTIONAL,   -- Need R
        rank4-8                         SEQUENCE(SIZE(4)) OF PortIndex8
            OPTIONAL,   -- Need R
        rank5-8                         SEQUENCE(SIZE(5)) OF PortIndex8
            OPTIONAL,   -- Need R
        rank6-8                         SEQUENCE(SIZE(6)) OF PortIndex8
            OPTIONAL,   -- Need R
        rank7-8                         SEQUENCE(SIZE(7)) OF PortIndex8
            OPTIONAL,   -- Need R
        rank8-8                         SEQUENCE(SIZE(8)) OF PortIndex8
            OPTIONAL,   -- Need R
        },
        portIndex4                      SEQUENCE{
        rank1-4                                         PortIndex4
            OPTIONAL,   -- Need R
        rank2-4                         SEQUENCE(SIZE(2)) OF PortIndex4
            OPTIONAL,   -- Need R
        rank3-4                         SEQUENCE(SIZE(3)) OF PortIndex4
            OPTIONAL,   -- Need R
        rank4-4                         SEQUENCE(SIZE(4)) OF PortIndex4
            OPTIONAL,   -- Need R
        },
        portIndex2                      SEQUENCE{
        rank1-2                                         PortIndex2
            OPTIONAL,   -- Need R
        rank2-2                         SEQUENCE(SIZE(2)) OF PortIndex2
            OPTIONAL,   -- Need R
        },
        portIndex1                      NULL
    }
PortIndex8::=                           INTEGER (0..7)
PortIndex4::=                           INTEGER (0..3)
PortIndex2::=                           INTEGER (0..1)
-- TAG-CSI-REPORTCONFIG-STOP
-- ASN1STOP
```

| CSI-ReportConfig IE field descriptions |
|---|
| Carrier |
| Indicates in which serving cell the CSI-ResourceConfig indicated below are to be found. If the field is absent, the resources are on the same serving cell as this report configuration. |
| codebookConfig |
| Codebook configuration for Type-1 or Type-II including codebook subset restriction. |
| cqi-FormatIndicator |
| Indicates whether the UE shall report a single (wideband) or multiple (subband) CQI. |
| cqi-Table |
| Which CQI table to use for CQI calculation. |
| csi-IM-ResourcesForInterference |
| CSI IM resources for interference measurement. |
| csi-ResourceConfigId of a CSI-ResourceConfig included in the configuration of the serving cell indicated with the field "carrierr" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement. |
| csi-ReportingBand |
| Indicates a contiguous or non-contiguous subset of subbands in the BWP which CSI |

| CSI-ReportConfig IE field descriptions |
|---|
| shall be reported for. Each bit in the bit-string represents one subband. The right-most bit in the bit string represents the lowest subband in the BWP. The choice determines the number of subbands (subbands3 for 3 subbands, subbands4 for 4 subbands, etc.). This field is absent if there are less than 24 PRBs (no sub band) and present otherwise, the number of sub bands can be from 3 (24 PRBs, sub band size 8) to 18 (72 PRBs, sub band size 4). |
| dummy |
| This field is not used in the specification. If received it shall be ignored by the UE. |
| groupBasedBeamReporting |
| Turning on/off group beam based reporting. |
| non-PMI-PortIndication |
| Port indication for RI/CQI calculation. For each CSI-RS resource in the linked ResourceConfig for channel measurement, a port indication for each rank R, indicating which R ports to use. Applicable only for non-PMI feedback. The first entry in non-PMI-PortIndication corresponds to a Non-Zero-Power (NZP)-CSI-RS-Resource indicated by the first entry in nzp-CSI-RS-Resources in the NZP-CSI-RS-ResourceSet indicated in the first entry of nzp-CSI-RS-ResourceSetList of the CSI- |

CSI-ReportConfig IE field descriptions

ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI-ResourceConfig and so on.
nrofReportedRS The number (N) of measured RS resources to be reported per report setting in a non-group-based report. N <= N_max, where N_max is either 2 or 4 depending on UE capability. When the field is absent the UE applies the value 1.
nzp-CSI-RS-ResourcesForInterference NZP CSI RS resources for interference measurement. csi-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement.
p0alpha Index of the p0-alpha set determining the power control for this CSI report transmission.
pdsch-BundleSizeForCSI PRB bundling size to assume for CQI calculation when reportQuantity is CRI/RI/i1/CQI. If the field is absent, the UE assumes that no PRB bundling is applied.
pmi-FormatIndicator Indicates whether the UE shall report a single (wideband) or multiple (subband) PMI.
pucch-CSI-ResourceList Indicates which PUCCH resource to use for reporting on PUCCH.
reportConfigType Time domain behavior of reporting configuration
reportFreqConfiguratian Reporting configuration in the frequency domain.
reportQuantity The CSI related quantities to report. Corresponds to L1 parameter 'ReportQuantity'.

CSI-ReportConfig IE field descriptions reportSlotConfig

Periodicity and slot offset.
reportSlotConfig-v1530

Extended value range for reportSlotConfig for semi-persistent CSI on PUSCH. If the field is present, the UE shall ignore the value provided in the legacy field (semiPersistentOnPUSCH.reportSlotConfig).
reportSlotOffsetList Timing offset Y for semi persistent reporting using PUSCH. This field lists the allowed offset values. This list must have the same number of entries as the pusch-TimeDomainAllocationList in PUSCH-Config. A particular value is indicated in DCI The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n + Y, second report in n + Y + P, where P is the configured periodicity.
Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, etc.
resourcesForChannelMeasurement Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.
subbandSize Indicates one out of two possible BWP-dependent values for the subband size. If csi-ReportingBandis absent, the UE shall ignore this field.
timeRestrictionForChannelMeasurements Time domain measurement restriction for the channel (signal) measurements
timeRestrictionForInterferenceMeasurements Time domain measurement restriction for interference measurements Table 14 provides an example of a CSI-ResourceConfig information IE that defines a group of one or more NZP-CSI-RS-ResourceSet, CSI-M-ResourceSet and/or CSI-SSB-ResourceSet.

TABLE 14

CSI-ResourceConfig information element

```
-- ASN1START
-- TAG-CSI-RESOURCECONFIG-START
CSI-ResourceConfig ::=        SEQUENCE {
    csi-ResourceConfigId         CSI-ResourceConfigId,
    csi-RS-ResourceSetList       CHOICE {
        nzp-CSI-RS-SSB                SEQUENCE {
            nzp-CSI-RS-ResourceSetList  SEQUENCE (SIZE (1..maxNrofNZP-
CSI-RS-ResourceSetsPerConfig)) OF NZP-CSI-RS-ResourceSetId
OPTIONAL, -- Need R
            csi-SSB-ResourceSetList       SEQUENCE (SIZE (1..maxNrofCSI-
SSB-ResourceSetsPerConfig)) OF CSI-SSB-ResourceSetId
OPTIONAL, -- Need R
        },
        csi-IM-ResourceSetList        SEQUENCE (SIZE (1..maxNrofCSI-IM-
ResourceSetsPerConfig)) OF CSI-IM-ResourceSetId
    },
    bwp-Id                BWP-Id,
    resourceType              ENUMERATED { aperiodic, semiPersistent,
periodic },
    ...
}
-- TAG-CSI-RESOURCECONFIG-STOP
-- ASN1STOP
```

| CSI-ResourceConfig IE field descriptions |
|---|
| bwp-Id |
| The DL BWP in which the CSI-RS associated with this CSI-ResourceConfig are located. |
| csi-ResourceConfigId |
| Used in CSI-ReportConfig to refer to an instance of CSI-ResourceConfig. |
| csi-RS-ResourceSetList |
| Contains up to maxNrofNZP-CSI-RS-ResourceSetsPerConfig resource sets if ResourceConfigType is 'aperiodic' and 1 otherwise. |

-continued

| CSI-ResourceConfig IE field descriptions |
|---|
| csi-SSB-ResourceSetList |
| List of SSB resources used for beam measurement and reporting in a resource set. |
| resource-Type |
| Time domain behavior of resource configuration. Does not apply to resources provided in the csi-SSB-ResourceSetList. |

Table 15 provides an example of an NZP-CSI-RS-ResourceSet IE, which includes a set of NZP-CSI-RS resources (their IDs) and set-specific parameters.

TABLE 15

NZP-CSI-RS-ResourseSet information element

```
-- ASN1START
-- TAG-NZP-CSI-RS-RESOURCESET-START
NZP-CSI-RS-ResourceSet ::=        SEQUENCE {
    nzp-CSI-ResourceSetId            NZP-CSI-RS-ResourceSetId,
    nzp-CSI-RS-Resources             SEQUENCE (SIZE (1..maxNrofNZP-CSI-
RS-ResourcesPerSet)) OF NZP-CSI-RS-ResourceId,
    repetition                        ENUMERATED { on, off }
OPTIONAL,   -- Need S
    aperiodicTriggeringOffset                            INTEGER(0..6)
OPTIONAL,   -- Need S
    trs-Info                          ENUMERATED {true}
OPTIONAL,   -- Need R
    ...
}
-- TAG-NZP-CSI-RS-RESOURCESET-STOP
-- ASN1STOP
```

| NZP-CSI-RS-ResourceSet IE field descriptions |
| --- |
| aperiodicTriggeringOffset |
| Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field, is absent the UE applies the value 0. |
| nzp-CSI-RS-Resources |
| NZP-CSI-RS-Resources associated with this NZP-CSI-RS resource set. For CSI, there are at most 8 NZP CSI RS resources per resource set. |
| repetition |
| Indicates whether repetition is on/off. If the field is set to 'OFF', or if the field is absent, |

| NZP-CSI-RS-ResourceSet IE field descriptions |
| --- |
| the UE may not assume that the NZP-CSI-RS resources within the resource set are transmitted with the same DL spatial domain transmission filter and with same NrofPorts in every symbol. Can only be configured for CSI-RS resource sets which are associated with CSI-ReportConfig with report of LI RSRP or "no report". |
| trs-Info |
| Indicates that the antenna port for all NZP-CSI-RS resources in the CSI-RS resource set is same. If the field is absent or released the UE applies the value "false". |

Table 16 provides an example of a CSI-SSB-ResourceSet IE used to configure one SS/PBCH block resource set, which refers to an SS/PBCH as indicated in ServingCellConfigCommon.

TABLE 16

| CSI-SSB-ResourceSet information element |
| --- |
| -- ASN1START |
| -- TAG-CSI-SSB-RESOURCESET-START |
| CSI-SSB-ResourceSet ::=                SEQUENCE { |
|    csi-SSB-ResourceSetId              CSI-SSB-ResourceSetId, |
|    csi-SSB-ResourceList               SEQUENCE (SIZE (1..maxNrofCSI-SSB-ResourcePerSet)) OF SSB-Index, |
|    ... |
| } |
| -- TAG-CSI-SSB-RESOURCESET-STOP |
| -- ASN1STOP |

Table 17 provides an example of a CSI-IM-ResourceSet IE used to configure a set of one or more CSI Interference Management (IM) resources (e.g., their IDs) and set-specific parameters.

TABLE 17

| CSI-IM-ResourceSet information element |
| --- |
| -- ASN1START |
| -- TAG-CSI-IM-RESOURCESET-START |
| CSI-IM-ResourceSet ::=                SEQUENCE { |
|    csi-IM-ResourceSetId               CSI-IM-ResourceSetId, |
|    csi-IM-Resources                   SEQUENCE (SIZE(1..maxNrofCSI-IM-ResourcesPerSet)) OF CSI-IM-ResourceId, |
|    ... |
| } |
| -- TAG-CSI-IM-RESOURCESET-STOP |
| -- ASN1STOP |

| CSI-IM-ResourceSet IE field descriptions |
| --- |
| csi-IM-Resources |
| CSI-IM-Resources associated with this CSI-IM-ResourceSet. |

Table 18 provides an example of a CSI-AperiodicTriggerStateList IE used to configure the UE with a list of aperiodic trigger states. Each codepoint of the DCI field "CSI request" is associated with one trigger state. Upon reception of the value associated with a trigger state, the UE will perform measurement of CSI-RSs and aperiodic reporting on L1 according to all entries in the associatedReportConfigInfoList for that trigger state.

TABLE 18

CSI-AperiodicTriggerStateList information element

```
-- ASN1START
-- TAG-CSI-APERIODICTRIGGERSTATELIST-START
CSI-AperiodicTriggerStateList     ::=     SEQUENCE   (SIZE   (1..maxNrOfCSI-
AperiodicTriggers)) OF CSI-AperiodicTriggerState
CSI-AperiodicTriggerState ::=    SEQUENCE {
    associatedReportConfigInfoList                          SEQUENCE
(SIZE(1..maxNrofReportConfigPerAperiodicTrigger))       OF         CSI-
AssociatedReportConfigInfo,
    ...
}
CSI-AssociatedReportConfigInfo ::=    SEQUENCE {
    reportConfigId            CSI-ReportConfigId,
    resourcesForChannel           CHOICE {
        nzp-CSI-RS              SEQUENCE {
            resourceSet                  INTEGER (1..maxNrofNZP-CSI-RS-
ResourceSetsPerConfig),
            qcl-info                 SEQUENCE ( SIZE (1..maxNrofAP-CSI-RS-
ResourcesPerSet)) OF TCI-StateId OPTIONAL -- Cond Aperiodic
        },
        csi-SSB-ResourceSet              INTEGER (1..maxNrofCSI-SSB-
ResourceSetsPerConfig)
    },
    csi-IM-ResourcesForInterference             INTEGER(1..maxNrofCSI-IM-
ResourceSetsPerConfig)    OPTIONAL, -- Cond CSI-IM-ForInterference
    nzp-CSI-RS-ResourcesForInterference    INTEGER    (1..maxNrofNZP-CSI-RS-
ResourceSetsPerConfig)    OPTIONAL,   -- Cond NZP-CSI-RS-ForInterference
    ...
}
-- TAG-CSI-APERIODICTRIGGERSTATELIST-STOP
-- ASN1STOP
```

| CSI-AssociatedReportConfigInfo IE field descriptions |
| --- |
| nzp-CSI-RS-ResourcesForInterference |
| NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (1 corresponds to the first entry, 2 to the second entry, etc.). |
| qcl-info |
| List of references to TCI-States tor providing the QCL source and QCL type for each |

| CSI-AssociatedReportConfigInfo IE field descriptions |
| --- |
| csi-IM-ResourcesForInterference |
| CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, etc.). The indicated CSI-IM-ResourceSet should have the same number of resources as the NZP-CSI-RS-ResourceSet indicated in nzp-CSI-RS-ResourcesforChannel. |
| csi-SSB-ResourceSet |
| CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, etc.). |

| CSI-AssociatedReportConfigInfo IE field descriptions |
| --- |
| NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, etc. |
| reportConfigId |
| The reportConfigId of one of the CSI-ReportConfigToAddMod configured in CSI-MeasConfig. |

-continued

| CSI-AssociatedReportConfigInfo IE field descriptions |
| --- |
| resourceSet |
| NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to the second entry, etc.). |

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForInterference | This field is optional need M if the CSI-ReportConfig identified by reportConfigId is configured with nzp-CSI-RS-ResourcesForInterference; otherwise it is absent. |

Table 19 provides an example of a CSI-SemiPersistentOnPUSCH-TriggerStateList IE used to configure the UE with list of trigger states for semi-persistent reporting of CSI on L1.

TABLE 19

| CSI-SemiPersistentOnPUSCH-TriggerStateList information element |
| --- |
| -- ASN1START |
| -- TAG-CSI-SEMIPERSISTENTONPUSCHTRIGGERSTATELIST-START |
| CSI-SemiPersistentOnPUSCH-TriggerStateList ::= SEQUENCE(SIZE (1..maxNrOfSemiPersistentPUSCH-Triggers)) OF CSI-SemiPersistentOnPUSCH-TriggerState |
| CSI-SemiPersistentOnPUSCH-TriggerState ::= SEQUENCE { |
|    associatedReportConfigInfo                 CSI-ReportConfigId, |
|    ... |
| } |
| -- TAG-CSI-SEMIPERSISTENTONPUSCHTRIGGERSTATELIST-STOP |
| -- ASN1STOP |

With respect to the above-described CSI reporting configurations (CSI-ReportConfig), each reporting configuration may be associated with a DL BWP identified by a higher layer parameter BWP identifier (bwp-id) and given by a CSI resource configuration (CSI-ResourceConfig) associated with the each reporting configuration.

As a time domain reporting operation for each reporting configuration, "aperiodic", "semi-persistent", and "periodic" types may be supported, and the types may be configured for a terminal by a base station through the parameter reportConfigType configured from a higher layer.

A semi-persistent CSI reporting method may support "PUCCH-based semi-persistent (semi-PersistentOnPUCCH)", and "PUSCH-based semi-persistent (semi-PersistentOnPUSCH)". In a periodic or semi-persistent CSI reporting method, a PUCCH or PUSCH resource on which CSI is to be transmitted may be configured for a terminal by a base station through higher layer signaling. The period and slot offset of a PUCCH or PUSCH resource on which CSI is to be transmitted may be given by the numerology of a UL BWP configured to transmit CSI reporting. In an aperiodic CSI reporting method, a PUSCH resource on which CSI is to be transmitted may be scheduled for a terminal by a base station through L1 signaling (e.g., DCI format 0_1).

With respect to the above-described CSI resource configuration (CSI-ResourceConfig), each CSI resource configuration may include S (where S≥1) pieces of CSI resource sets (e.g., given by a higher layer parameter csi-RS-ResourceSetList). A CSI resource set list may include an NZP CSI-RS resource set and an SS/PBCH block set, or may include a CSI-interference measurement (CSI-IM) resource set. Each CSI resource configuration may be positioned in a DL BWP identified by a higher layer parameter bwp-id and may be connected to a CSI reporting configuration in the same DL BWP. A time domain operation of a CSI-RS resource in a CSI resource configuration may be configured to one of "aperiodic", "periodic", or "semi-persistent" by a higher layer parameter resourceType. With respect to a periodic or semi-persistent CSI resource configuration, the number of CSI-RS resource sets may be limited to be S=1, and a configured period and slot offset may be given by the numerology of a DL BWP identified by a bwp-id. One or more CSI resource configurations for channel and interference measurement may be configured for a terminal by a base station through higher layer signaling, and may include the following CSI resources.

CSI-IM resource for interference measurement

NZP CSI-RS resource for interference measurement

NZP CSI-RS resource for channel measurement

With respect to CSI-RS resource sets associated with resource configurations having a higher layer parameter resourceType configured to "aperiodic", "periodic", or "semi-persistent", the trigger state of a CSI reporting configuration having reporType configured to "aperiodic", and a resource configuration for channel or interference measurement on one or multiple component cells (CCs) may be configured by a higher layer parameter CSI-AperiodicTriggerStateList.

A terminal may use a PUSCH for aperiodic CSI reporting, and may use a PUCCH for periodic CSI reporting. The terminal may perform semi-persistent CSI reporting using a PUSCH when the reporting is triggered or activated by DCI, and using a PUCCH after the reporting is activated by a MAC control element (MAC CE).

As described above, a CSI resource configuration may be also configured to aperiodic, periodic, and semi-persistent. A combination of a CSI reporting configuration and a CSI resource configuration may be supported based on Table 20 below.

TABLE 20

Triggering/Activation of CSI Reporting for the possible CSI-RS Configurations.

| CSI-RS Configuration | Periodic CSI Reporting | Semi-Persistent CSI Reporting | Aperiodic CSi Reporting |
|---|---|---|---|
| Periodic CSI-RS | No dynamic triggering/ activation | For reporting on PUCCH, theUE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

Aperiodic CSI reporting may be triggered by a "CSI request" field in DCI format 0_1 described above, corresponding to scheduling DCI of a PUSCH. A terminal may monitor a PDCCH, obtain DCI format 0_1, and obtain scheduling information of a PUSCH and a CSI request indicator. A CSI request indicator may be configured to have $N_{TS}$ (=0, 1, 2, 3, 4, 5, or 6) number of bits, and may be determined by higher layer signaling (reportTriggerSize). One trigger state among one or multiple aperiodic CSI reporting trigger states which may be configured by higher layer signaling (CSI-AperiodicTriggerStateList) may be triggered by a CSI request indicator.
- if all of the bits in a CSI request field are 0, the bit values may indicate CSI reporting is not requested.
- If the number (M) of configured CST trigger states in a CSI-AperiodicTriggerStateList is larger than $2^{N_{TS}}-1$, M CSI trigger states may be mapped to $2^{N_{TS}}-1$ trigger states according to a pre-defined mapping relation, and one trigger state among the $2^{N_{TS}}-1$ trigger states may be indicated by a CSI request field.
- if the number (M) of configured CSI trigger states in a CSI-AperiodicTriggerStateLite is smaller than or equal to $2^{N_{TS}}-1$, one of M CSI trigger states may be indicated by a CST request field.

Table 21 below shows an example of a relation between a CSI request indicator and a CSI trigger state that can be indicated by a corresponding indicator.

TABLE 21

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

A terminal may measure a CSI resource in a CSI trigger state triggered by a CSI request field, and then generate CSI including at least one of CQI, PMI, CRI, SSBRI, LI, RI, or L1-RSRP described above. The terminal may transmit obtained CSI by using a PUSCH scheduled by a corresponding DCI format 0_1. If one bit corresponding to a UL data indicator (UL-SCH indicator) in the DCI format 0_1 indicates "1", the terminal may multiplex the obtained CSI with UL data (UL-SCH) by using a PUSCH resource scheduled by the DCI format 0_1, to transmit the multiplexed CSI and data. If one bit corresponding to a UL data indicator (UL-SCH indicator) in the DCI format 0_1 indicates "0", the terminal may map only the CSI to a PUSCH resource scheduled by the DCI format 0_1, without UL data (UL-SCH), to transmit the CSI.

Figure 6:
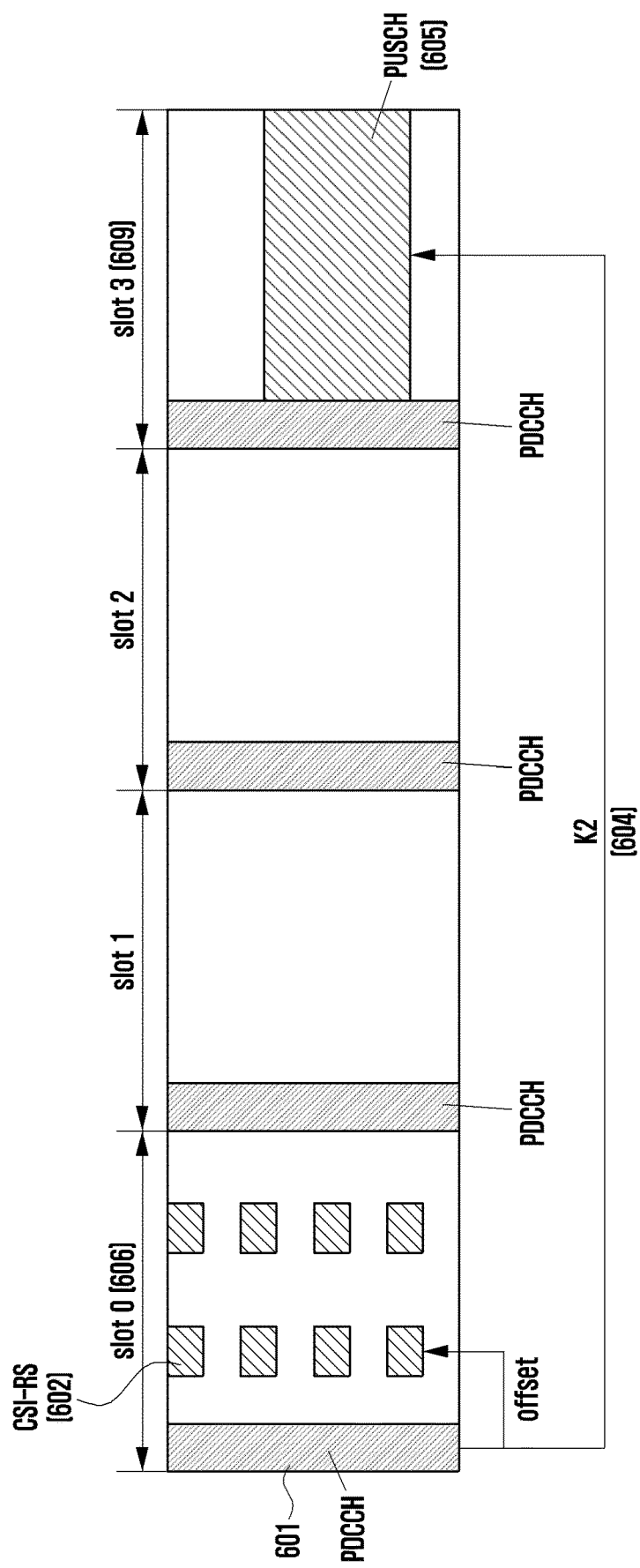
FIG. 6 illustrates a method of aperiodic CSI measurement and reporting in 5G according to an embodiment.

FIG. 6 illustrates a method of aperiodic CSI measurement and reporting in 5G according to an embodiment.

Referring to FIG. 6, a terminal may obtain a DCI format 0_1 by monitoring a PDCCH 601, and obtain scheduling information of a PUSCH 605 and CST request information from the DCI format 0_1. The terminal may obtain resource information of a CSI-RS 602 to be measured, from a received CSI request indicator. The terminal may determine a time point at which the terminal should measure a resource of the CSI-RS 602, based on a time point at which the DCI format 0_1 is received, and an offset-related parameter (e.g., the aperiodicTriggeringOffset described above) in a CSI resource set configuration (e.g., an NZP CSI-RS resource set configuration (NZP-CSI-RS-ResourceSet)). The terminal may receive an offset value X of the parameter aperiodicTriggeringOffset in an NZP-CSI-RS resource set configuration from a base station by higher layer signaling, and the configured offset value X may be an offset between a slot on which DCI triggering aperiodic CSI reporting is received, and a slot on which a CSI-RS resource is transmitted. The value of the parameter aperiodicTriggeringOffset and an offset value X may have a mapping relation therebetween as shown in Table 22 below.

TABLE 22

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

In FIG. 6, an offset value X is configured to be 0. A terminal may receive a CSI-RS 602 in slot 0 606 having received a DCI format 01 triggering aperiodic CSI reporting. In addition, the terminal may report CSI information determined based on the received CSI-RS, through the PUSCH 605 to the base station. The terminal may obtain scheduling information of the PUSCH 605 for CSI reporting from the DCI format 0_1. For example, the terminal may obtain information associated with a slot in which the PUSCH 605 is to be transmitted, from time domain resource allocation information of the PUSCH 605, as described above, in the DCI format 0_1. In FIG. 6, the terminal obtains 3 as a K2 value 604 corresponding to a slot offset value relating to PDCCH-to-PUSCH, and accordingly, the PUSCH 605 is transmitted in slot 3 609, which is spaced 3 slots apart from slot 0 606, i.e., the time point at which the PDCCH 601 was received.

Figure 7:
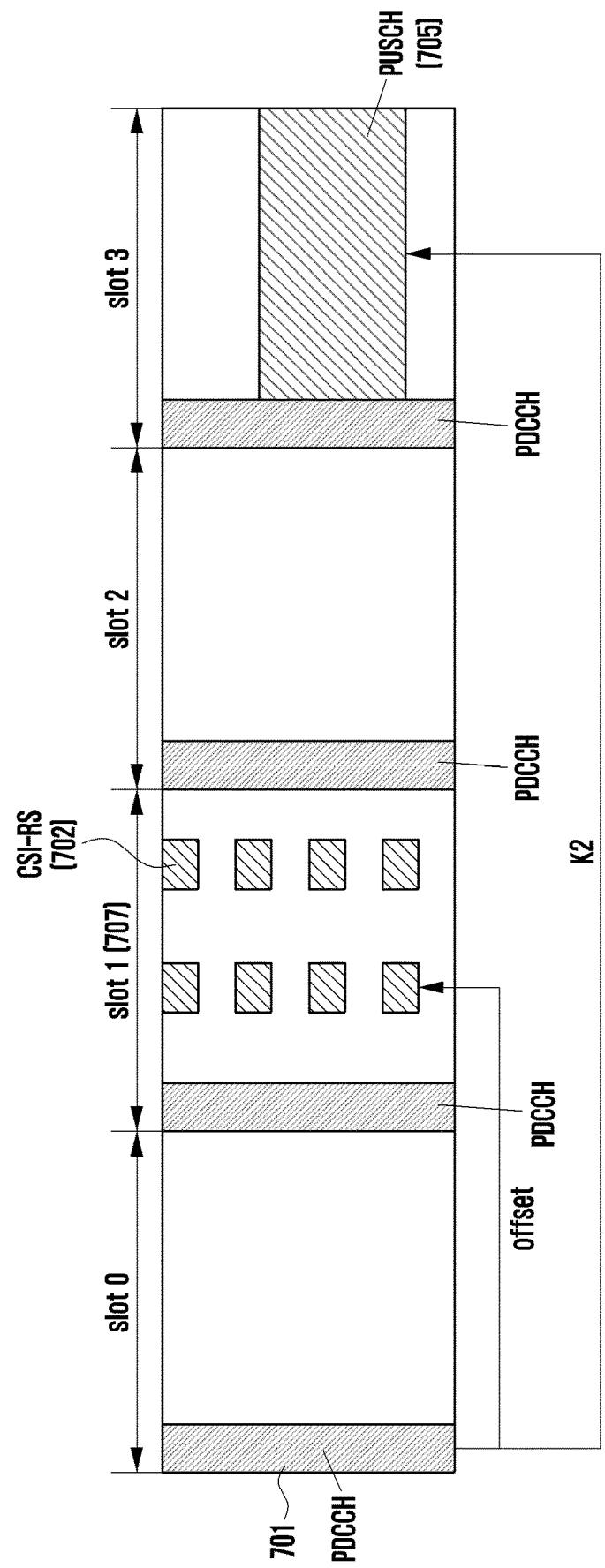
FIG. 7 illustrates a method of aperiodic CSI measurement and reporting in 5G according to an embodiment.

FIG. 7 illustrates a method of aperiodic CSI measurement and reporting in 5G according to an embodiment.

Referring to FIG. 7, a terminal may obtain a DCI format 0_1 by monitoring a PDCCH 701, and obtain scheduling information of a PUSCH 705 and CSI request information from the DCI format 0_1. The terminal may obtain resource information of a CSI-RS 702 to be measured, from a received CSI request indicator. In FIG. 7, an offset value X relating to a CSI-RS is configured to be 1. A terminal may receive a CSI-RS 702 in a slot 707 positioned one slot after slot 1 707 having received a DCI format 0_1 triggering aperiodic CSI reporting, and may report CSI information measured by the received CSI-RS, through a PUSCH 705 to the base station.

The higher layer signaling may correspond to at least one signaling among MIB, SIB, RRC, and MAC CE, and L1 signaling may correspond to DCI or PDCCH.

In 5G, one or a plurality of BWPs may be configured for a terminal, and one bandwidth among the configured BWPs may be activated. A base station may transmit, to a terminal, a command for activating a particular BWP, after including the command in DCI, and if a BWP index received through the DCI is different from the index of a BWP currently activated, the terminal may change the BWP. Since measuring and reporting of a channel state of an activated BWP can be performed after the BWP is activated, CSI of the activated BWP is absent, and thus, it may be difficult to transmit or receive a data channel immediately after the change to the corresponding BWP.

In accordance with an aspect of the disclosure, a method is provided for more effectively measuring and reporting a channel state of a changed BWP. If a terminal satisfies a particular condition (e.g., a slot offset value of data scheduling is larger than a particular value, a slot offset value of CSI measurement is larger than a particular value, etc.), the terminal may change a BWP, measure a reference signal transmitted in the changed BWP, and transmit a corresponding measurement value through the changed BWP. Data transmission or reception in a BWP changed through the proposed operation can be more effectively performed.

As described above, one or multiple BWPs may be configured for a terminal, and the terminal may perform transmission or reception with a base station through a BWP activated among the one or multiple BWPs. The terminal may monitor a PDCCH in the activated BWP, and obtain DCI.

The terminal may be instructed to perform aperiodic CSI reporting, through a CSI request field in a DCI (e.g., DCI scheduling PUSCH, or DCI format 0_1 scheduling PUSCH). A particular code point or a field bit value of a CSI request field may indicate a particular CSI trigger state (CSI-AperiodicTriggerState) in a CSI trigger state list (CSI-AperiodicTriggerStateList) configured through higher layer signaling.

A particular CSI trigger state may be associated with a particular CSI reporting configuration (CSI-ReportConfig), and a CSI reporting configuration may be associated with the particular CSI resource configuration.

A CSI resource configuration may be associated with one or multiple CSI resource sets (e.g., at least one of NZP CSI-RS resource sets (NZP-CSI-RS-ResourceSet), SSB resource sets (CSI-SSB-ResourceSet), and CSI-IM resource sets (CSI-IM-ResourceSet)).

CSI resource sets in a CSI resource configuration may be associated with a DL BWP, based on the value of a bwp-id or a BWP index-related parameter in the CSI resource configuration. If the value of a bwp-id in a particular CSI resource configuration indicates BWP #1, this may imply that CSI resource sets in the CSI resource configuration are positioned in BWP #1. The terminal may perform CSI measurement in a BWP configured by a bwp-id on CSI resource sets in a CSI resource configuration associated with a CSI reporting configuration associated with a CSI trigger state indicated by a CSI request field in DCI. The terminal may report measured CSI to the base station after mapping the measured CSI to a PUSCH transmission resource scheduled by the received DCI.

There may be an offset between a time point of reception of a DCI format including a CSI request indicator, and a time point of transmission of a CSI resource indicated by the CSI request indicator. The terminal may determine a time point at which the terminal should measure a CSI-RS transmitted, based on an offset-related parameter (e.g., an aperiodicTriggeringOffset) in a CSI resource set configuration.

An aperiodic CSI request indicator, a CSI trigger state configuration, a CSI reporting configuration, a CSI resource configuration, and a CSI resource set configuration may be configured for the terminal as shown in Table 23 below.

TABLE 23

| CSI request field | CSI trigger state | CSI-ReportConfigId | CSI-ResourceConfigId | NZP-CSI-RS ResourceSetConfig |
|---|---|---|---|---|
| 00 | no CSI request | N/A | N/A | N/A |
| 01 | CSI trigger state#1 | CSI report# | CSI resource# (BWP#1(bwp-id = 1)) | NZP-CSI-RS ResourceSet#1 (aperiodicTriggering Offset = 0) |
| 10 | CSI trigger state#2 | CSI report#2 | CSI resource#2 (BWP#2(bwp-id = 2)) | NZP-CSI-RS ResourceSet #2 (aperiodicTriggeringOffset = 0) |
| 11 | CSI trigger state#3 | CSI report#3 | CSI resource#3 (BWP#2(bwp-id = 2)) | NZP-CSI-RS ResourceSet #3 (aperiodicTriggeringOffset = 3) |

As shown in Table 23, if the value of a CSI request field is "00", a CSI request is not indicated.

If the terminal receives "01" as the value of a CSI request field, the terminal may measure a CSI-RS received through a CSI resource relating to CSI resource set configuration #1 (NZP-CSI-RS ResourceSet #1) in CSI resource configuration #1 (CSI resource #1) associated with CSI reporting configuration #1 (CSI report #1). The terminal may generate CSI, based on a result of the measurement, and may report the generated CSI. CSI resource set configuration #1 may be assumed to be transmitted in BWP #1 according to bwp-id configuration information of CSI resource configuration #1. In addition, the terminal may assume that a slot in which DCI is received and a slot in which a CSI-RS is transmitted are the same, from an offset parameter in a CSI resource set configuration (aperiodicTriggeringOffset=0).

If the terminal receives "10" as the value of a CSI request field, the terminal may measure a CSI-RS received through a CSI resource relating to CSI resource set configuration #2 (NZP-CSI-RS ResourceSet #2) in CST resource configuration #2 (CSI resource #2) associated with CSI reporting configuration #2 (CSI report #2). The terminal may generate CSI, based on a result of the measurement, and may report the generated CSI. CSI resource set configuration #2 may be assumed to be transmitted in BWP #2 according to bwp-id configuration information of CSI resource configuration #2. In addition, the terminal may assume that a slot in which DCI is received and a slot in which a CSI-RS is transmitted are the same, from an offset parameter in a CSI resource set configuration (aperiodicTriggeringOffset=0).

If the terminal receives "11" as the value of a CSI request field, the terminal may measure a CSI-RS received through a CSI resource relating to CSI resource set configuration #3 (NZP-CSI-RS ResourceSet #3) in CSI resource configuration #3 (CSI resource #3) associated with CSI reporting configuration #3 (CSI report #3). The terminal may generate CSI, based on a result of the measurement, and may report the generated CSI. CSI resource set configuration #3 may be assumed to be transmitted in BWP #2 according to bwp-id configuration information of CSI resource configuration #3. In addition, the terminal may measure a CSI-RS and generate CSI by assuming, from an offset parameter in a CSI resource set configuration, that a slot in which the CSI-RS is transmitted is slot n+3 if a slot having received DCI is slot n (aperiodicTriggeringOffset=3).

In a method for performing aperiodic CSI measurement and reporting, a BWP that has been currently activated, a BWP indicated by a BWP indicator of DCI, and a BWP in which a CSI-RS indicated by a CSI request indicator is transmitted may be identically or differently indicated. According to the contents of an indicator, the terminal may perform CSI measurement and reporting on a current BWP, or may perform CSI measurement and reporting on a changed BWP.

Various embodiments related to a method for CSI measurement and reporting in consideration of a BWP change are proposed.

For convenience, some terms used below will be defined as follows.

BWP A: a BWP that has been activated

BWP B: a BWP indicated by a BWP indicator (or a BWP in which a data channel (e.g., a PUSCH) is scheduled)

BWP C: a BWP in which a CSI resource indicated by a CSI request indicator is transmitted If BWP A, BWP B, and BWP C are all the same (e.g. BWP A=BWP B=BWP C =BWP #1), the terminal may measure a CSI-RS in a currently activated BWP #1, generate CSI, and report the measured CSI to the base station in BWP #1 by using a PUSCH scheduled by received DCI.

If both BWP A and BWP C are the same, but BWP B is different (e.g., BWP A=BWP C(=BWP #1) #BWP B (=BWP #2)), the terminal may measure a CSI-RS in currently activated BWP #1, generate CSI, perform a BWP change to BWP #2 indicated by received DCI, and report the CSI measured in BWP #1 to the base station in BWP #2 by using a PUSCH.

If BWP A and BWP B are the same, but BWP C is different (e.g., BWP A=BWP B (=BWP #1) BWP C(=BWP #2)), or BWP A, BWP B, and BWP C are all different from each other (e.g., BWP A (=BWP #1): BWP B (=BWP #2) #BWP C(=BWP #3)), the terminal may determine there is an error in received DCI. That is, the terminal may not expect triggering of aperiodic CSI reporting with respect to a BWP that is different from a currently activated BWP, or a BWP of a data channel (e.g., a PUSCH) scheduled by DCI.

If BWP B and BWP C are the same, but BWP A is different (e.g. BWP A (=BWP #1) t BWP B=BWP C(=BWP #2)), the terminal may perform a BWP change and perform CSI measurement and reporting on the changed BWP. The terminal may receive and measure a CSI-RS transmitted in the changed BWP, and report CSI measured in the changed BWP to the base station by using a PUSCH scheduled by received DCI.

The terminal may assume that a time point at which the CSI-RS is transmitted in the changed BWP corresponds to a slot in which the PUSCH is transmitted. That is, the terminal may assume that an offset value (e.g., an aperiodicTriggeringOffset) between a time point at which a DCI format including a CSI request indicator is received and a time point at which a CSI resource indicated by the CSI request indicator is transmitted corresponds to a K2 value in time domain resource allocation information of a PUSCH scheduled by corresponding DCI.

Figure 8:
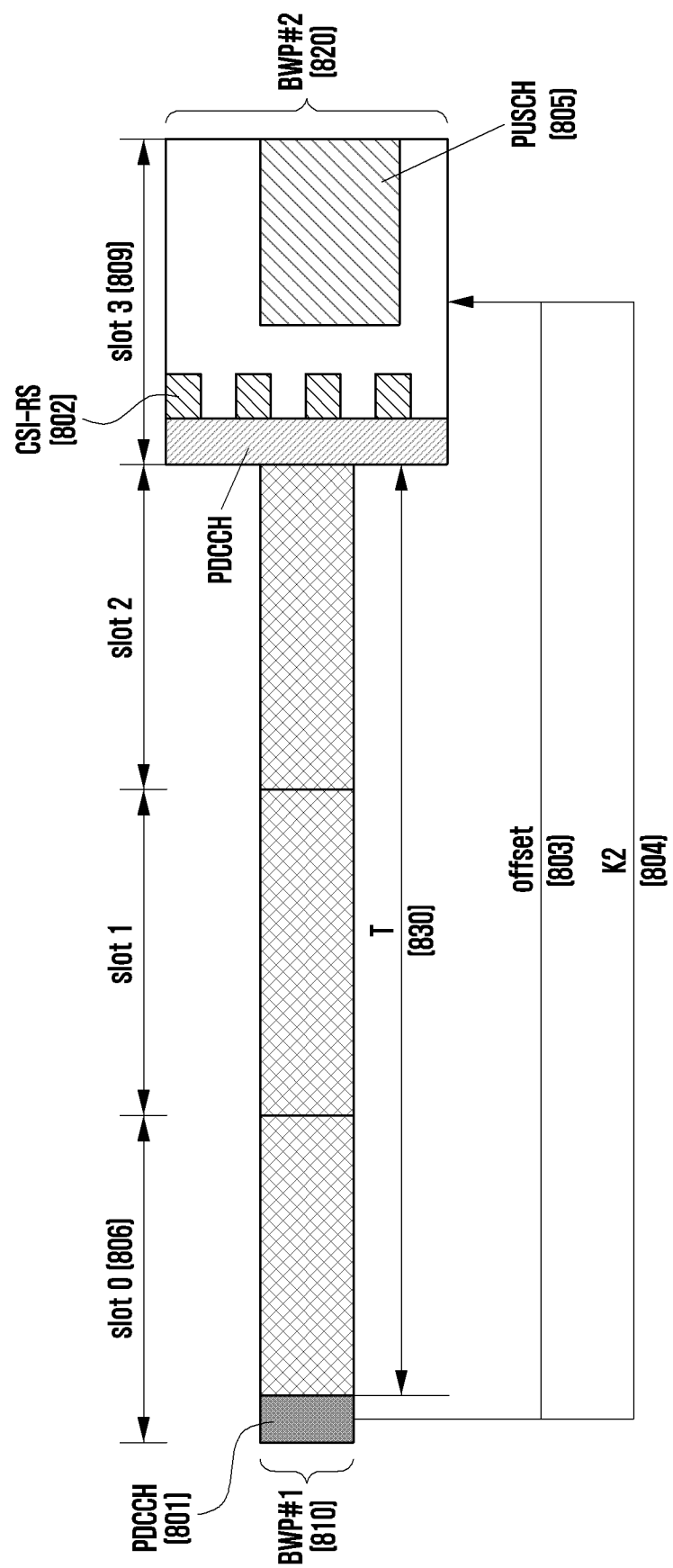
FIG. 8 illustrates a method of aperiodic CSI measurement and reporting according to an embodiment.

FIG. 8 illustrates a method of aperiodic CSI measurement and reporting according to an embodiment.

Referring to FIG. 8, BWP #1 810 and BWP #2 820 are configured for a terminal. If a current time point corresponds to slot 0 806, BWP #1 810 is an activated BWP, and the terminal may monitor a PDCCH 801 in BWP #1 810 to obtain DCI.

The terminal may obtain scheduling information of a PUSCH 805, a BWP indicator, and a CSI request indicator from the received DCI. In FIG. 8, a BWP indicator included in DCI is assumed to indicate BWP #2 820, and a CSI request indicator is assumed to indicate a CSI-RS resource set of BWP #2 820 (i.e., the CSI request indicator indicates a CSI trigger state associated with a CSI reporting configuration associated with a CSI resource configuration configured to bwp-id=2, e.g., the CSI request indicator may correspond to a CSI request field of "11" in Table 23 above).

The terminal may perform a BWP change from BWP #1 810 to BWP #2 820 according to a command of a BWP indicator in the received DCI. The terminal may expect that the terminal does not perform any transmission or reception during T 830, which is a time interval from a third symbol of a slot in which a PDCCH 801 having obtained DCI is transmitted, to a starting point of a slot in which a PUSCH 805 is scheduled. The starting point of the slot in which the PUSCH 805 is scheduled may be determined by the value of a K2 804 in time domain resource allocation information of the PUSCH 805.

The terminal may perform transmission or reception in BWP #2 820 from slot 3 809, based on the value of the K2 804 indicated by the DCI. The terminal may assume that a CSI-RS of BWP #2 820 is transmitted at a time point at which the PUSCH 805 is transmitted (i.e., slot 3 809), and may measure the CSI-RS 802. That is, the terminal may assume that a resource offset 803 of the CSI-RS is identical to the K2 804.

To determine a transmission time point of a CSI-RS, at least one Methods 1 to 3 below, or a combination thereof, may be used.

Method 1

The terminal may neglect an offset-related parameter field value (e.g., aperiodicTriggeringOffset) in a CSI resource set configuration indicated by a CSI request indicator, and may assume that the field value is the same as K2.

Method 2

The terminal may expect that CSI reporting on a CSI resource set in which an offset-related parameter value (e.g., aperiodicTriggeringOffset) in a CSI resource set configuration indicated by a CSI request indicator is the same as K2 is to be triggered. That is, if the base station requests CSI measurement and reporting on a changed BWP from the terminal, the base station may indicate a CSI trigger state associated with a CSI resource set having the same offset value as K2 by using a CSI request indicator.

Method 3

The terminal may expect that a K2 value indicated by a time domain resource allocation indicator of a PUSCH is indicated to be the same as an offset-related parameter value in a CSI resource set configuration indicated by a CSI request indicator. That is, if the base station requests CSI measurement and reporting on a new BWP from the terminal by using a CSI request indicator, the base station may indicate a K2 value relating to a PUSCH such that the K2 value is the same as an offset value in a CSI resource set triggered by the CSI request indicator.

As described above, a terminal can perform CSI measurement and reporting on a changed BWP as fast as possible. That is, CSI measurement and reporting can be performed immediately after a BWP change. Accordingly, a base station can quickly obtain CSI relating to a changed BWP from a terminal, and effectively perform data transmission or reception in the changed BWP, based on the obtained CSI.

A terminal immediately performs CSI measurement and reporting on a changed BWP, so that the terminal can quickly complete various preparation processes (e.g., channel measurement, time and frequency tracking, adaptive gain control (AGC), etc.) for transmitting or receiving data in the changed BWP, and can effectively transmit or receive data. In addition, additional activation time for channel measurement and reporting of a terminal is minimized, so that the power consumption of the terminal can be reduced.

If the terminal receives scheduling information of a PUSCH excluding UL data (UL-SCH) by a UL data indicator (e.g., a UL-SCH indicator) field in DCI (i.e., one bit corresponding to the UL-SCH indicator indicates "0"), the terminal may apply the method illustrated in FIG. 8. That is, if a PUSCH only for CSI reporting, not for the purpose of transmitting UL data, is scheduled for the terminal from the base station, the terminal may exceptionally perform the above described method for CSI measurement and reporting on a new BWP.

If a K2 value in time domain resource allocation information of a PUSCH in DCI is larger than a particular threshold (9), the terminal may apply the method illustrated in FIG. 8. If a K2 value is larger, the terminal may sufficiently ensure time for preparations for a change to a new BWP, CSI measurement in the new BWP, and PUSCH transmission in the new BWP, and thus it may be easier for the terminal to perform CSI measurement and reporting on a new BWP as described above. Therefore, if a K2 value is larger than a threshold, the terminal may exceptionally perform the above described method for CSI measurement and reporting on a new BWP.

If BWP B and BWP C are the same, BWP A is different (e.g., BWP A (=BWP #1) ≠BWP B=BWP C(=BWP #2)), and a CSI resource offset value indicated by a CSI request indicator in obtained DCI is larger than a BWP change latency time interval of the terminal (e.g., $T_{BWP}$), the terminal may perform a BWP change and perform CSI measurement and reporting on a changed BWP.

More specifically, the terminal may perform a BWP change according to a BWP indicator and generate CSI by measuring a CSI resource relating to a changed BWP at a time point after $T_{BWP}$, as specified by a CSI resource offset.

The terminal may report the generated CSI at a time point of transmission of a PUSCH scheduled by corresponding DCI. The time point may be indicated by a time domain resource allocation field. The CSI resource offset value indicated by the CSI request indicator in the DCI may be indicated to be larger than $T_{BWP}$ and smaller than or equal to a K2 value in time domain resource allocation information of the PUSCH.

Figure 9:
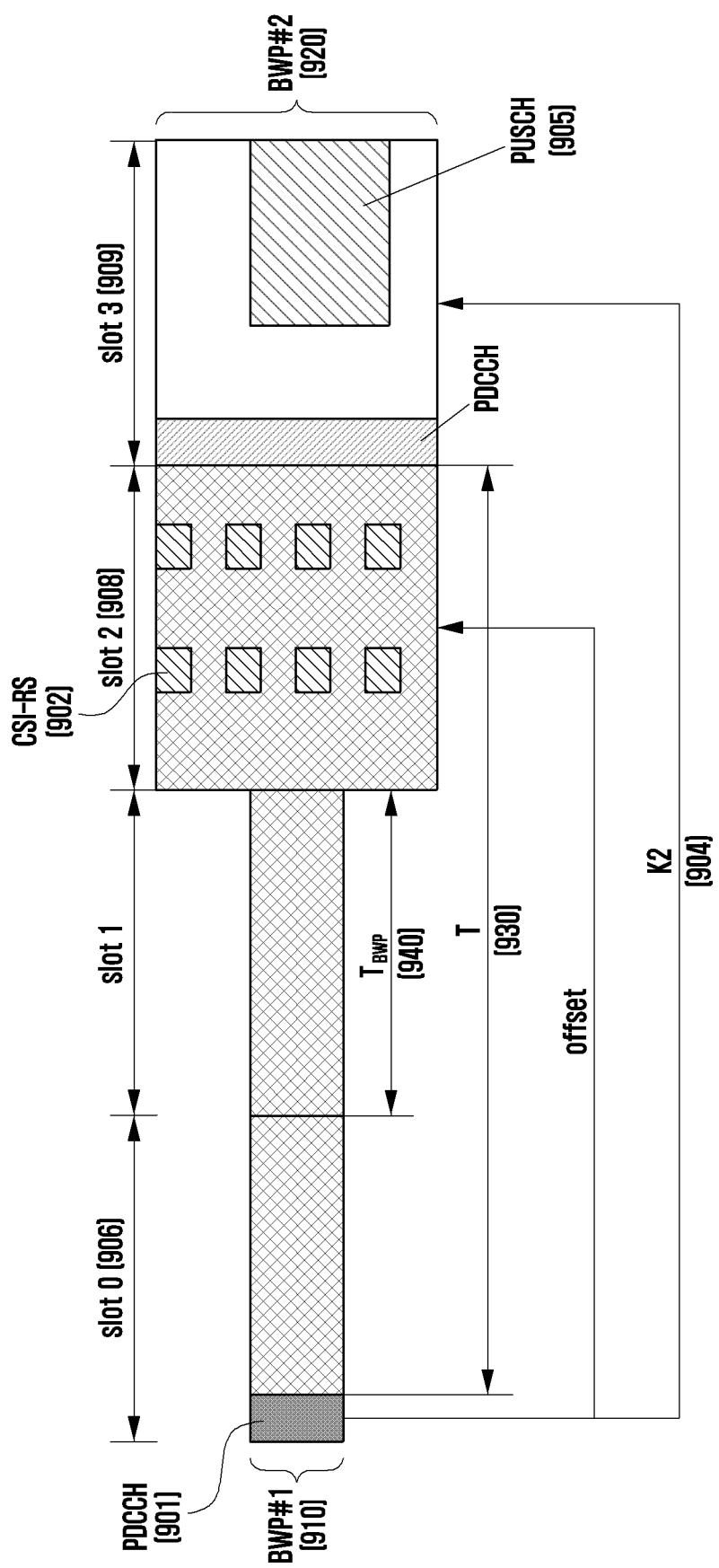
FIG. 9 illustrates a method of aperiodic CSI measurement and reporting according to an embodiment.

FIG. 9 illustrates a method of aperiodic CSI measurement and reporting according to an embodiment.

Referring to FIG. 9, BWP #1 910 and BWP #2 920 are configured for a terminal. If a current time point corresponds to slot 0 906, BWP #1 910 is an activated BWP, and the terminal may monitor a PDCCH 901 in BWP #1 910 to obtain DCI. The terminal may obtain scheduling information of a PUSCH 905, a BWP indicator, and a CSI request indicator from the received DCI.

In FIG. 9, a BWP indicator included in DCI is assumed to indicate BWP #2 920, and a CSI request indicator is assumed to indicate a CSI-RS resource set of BWP #2 920 (i.e., the CSI request indicator indicates a CSI trigger state associated with a CSI reporting configuration associated with a CSI resource configuration configured to bwp-id=2, e.g., the CSI request indicator may correspond to a CSI request field of "11" as shown in Table 23 above).

In FIG. 9, a BWP change latency time interval $T_{BWP}$ of the terminal is assumed to be one slot, an offset value (e.g., an aperiodicTriggeringOffset) of a CSI resource indicated by a CSI request indicator in DCI is assumed to be 2, and a scheduling offset value (K2) of the PUSCH 905 is assumed to be 3. That is, a situation in which an offset value of a CSI resource indicated by a CSI request indicator is larger than $T_B$WP and equal to or smaller than a K2 value is assumed.

The terminal may perform a BWP change from BWP #1 910 to BWP #2 920 according to a BWP indicator in the received DCI. The terminal may expect that the terminal does not perform any transmission or reception during T 930, which is a time interval from a third symbol of a slot 906 in which a PDCCH 901 having obtained DCI was transmitted to a starting point of a slot in which a PUSCH 905 is scheduled. The starting point may be determined by the value of a K2 904 in time domain resource allocation information of the PUSCH 905.

If an offset value of a CSI resource indicated by a CSI request indicator in DCI is larger than $T_{BWP}$, the terminal may only receive a CSI-RS 902 in a changed BWP (e.g., BWP #2 920 in FIG. 9) at a corresponding CSI-RS transmission time point. That is, in FIG. 9, the terminal may not perform transmission or reception, except for receiving the CSI-RS 902 in BWP #2 920 at the time point of slot 2 908, during a time interval T 930.

The terminal may generate CSI based on the CST-RS 902 received in BWP #2 920 at the time point of slot 2 908, and report the generated CSI through the PUSCH 905 (i.e., PUSCH scheduled by obtained DCI) of slot 3 909 to the base station.

As described above, a terminal can perform CSI measurement and reporting on a changed BWP quicker than a conventional terminal. Moreover, there is a difference between a CSI measurement time point and a CSI reporting time point, and thus a terminal can ensure the time required to report CSI in UL after measuring and generating the CSI in DL. Accordingly, a base station can quickly obtain CSI relating to a changed BWP from a terminal, and effectively perform data transmission or reception in the new BWP, based on the obtained CSI.

A terminal immediately performs CSI measurement and reporting on a changed BWP, so that the terminal can quickly complete various preparation processes (e.g., channel measurement, time and frequency tracking, AGC, etc.) for transmitting or receiving data in the changed BWP, and can effectively transmit or receive data. In addition, additional activation time for channel measurement and reporting of a terminal is minimized, so that the power consumption of the terminal can be reduced.

If the terminal receives scheduling information of a PUSCH excluding UL data (e.g., UL-SCH) by a UL data indicator (e.g., UL-SCH indicator) field in DCI (i.e., one bit corresponding to the UL-SCH indicator indicates "0"), the terminal may perform the method illustrated in FIG. 9. That is, if a PUSCH only for CSI reporting, not for the purpose of transmitting UL data, is scheduled for the terminal from the base station, the terminal may perform the above described method for only CSI measurement and reporting on a new BWP.

If a K2 value in time domain resource allocation information of a PUSCH in DCI is larger than a particular threshold (η), the terminal may perform the method illustrated in FIG. 9. If a K2 value is larger, the terminal may sufficiently ensure time for preparations for a change to a new BWP, CSI measurement in the new BWP, and PUSCH transmission in the new BWP, and thus it may be easier for the terminal to perform CSI measurement and reporting on a new BWP as described above. Therefore, if a K2 value is larger than a particular threshold, the terminal may perform the above described method only for CSI measurement and reporting on a new BWP.

In accordance with an aspect of the disclosure, a method for measuring and reporting CSI by using scheduling DCI (e.g. DCI format 1_1) of a PDSCH is provide, wherein a base station may indicate, to a terminal, scheduling information of a PDSCH, and allocation information (e.g., a PUCCH resource indicator in DCI format 1_1) of a PUCCH in which a HARQ-ACK for the PDSCH is to be transmitted, by using DCI. Specifically, the base station may indicate, to the terminal, a K0 value as a part of time domain resource allocation information of a PDSCH, a PUCCH resource on which an HARQ-ACK for the PDSCH is transmitted, and a K1 value corresponding to a time point at which the PUCCH resource is transmitted.

A K0 value may correspond to PDCCH-to-PDSCH slot timing as described above, i.e., a time interval in units of slots between a time point of reception of a PDCCH and a time point of transmission of a PDSCH scheduled by the received PDCCH, and a K1 value may correspond to PDSCH-to-PUCCH slot timing, i.e., a time interval in units of slots between a time point of reception of a PDSCH and a time point of transmission of a HARQ-ACK for the received PDSCH. A K1 value is one of configuration parameters relating to a PUCCH, and may be configured for a terminal by a base station through higher layer signaling (e.g., RRC). The PUCCH configuration information may include the parameters as shown in Table 24 below.

TABLE 24

PUCCH-Config information element

```
-- ASN1START
-- TAG-PUCCH-CONFIG-START
PUCCH-Config ::=                    SEQUENCE {
    resourceSetToAddModList              SEQUENCE (SIZE (1..maxNrofPUCCH-
ResourceSets)) OF PUCCH-ResourceSet       OPTIONAL, -- Need N
    resourceSetToReleaseList             SEQUENCE (SIZE (1..maxNrofPUCCH-
ResourceSets)) OF PUCCH-ResourceSetId     OPTIONAL, -- Need N
    resourceToAddModList                 SEQUENCE (SIZE (1..maxNrotPUCCH-
Resources)) OF PUCCH-Resource             OPTIONAL, -- Need N
    resourceToReleaseList                SEQUENCE (SIZE (1..maxNrofPUCCH-
Resources)) OF PUCCH-ResourceId           OPTIONAL, -- Need N
    format1                              SetupRelease   { PUCCH-FormatConfig }
OPTIONAL, -- Need M
    format2                              SetupRelease   { PUCCH-FormatConfig }
OPTIONAL, -- Need M
    format3                              SetupRelease   { PUCCH-FormatConfig }
OPTIONAL, -- Need M
    format4                              SetupRelease   { PUCCH-FormatConfig }
OPTIONAL, -- Need M
    schedulingRequestResourceToAddModList    SEQUENCE (SIZE (1..maxNrofSR-
Resources)) OF SchedulingRequestResourceConfig    OPTIONAL, -- Need N
    schedulingRequestResourceToReleaseList    SEQUENCE (SIZE (1..maxNrofSR-
Resources)) OF SchedulingRequestResourceId      OPTIONAL, -- Need N
    multi-CSI-PUCCH-ResourceList         SEQUENCE (SIZE (1..2)) OF PUCCH-
ResourceId                                OPTIONAL, -- Need M
    dl-DataToUL-ACK                      SEQUENCE (SIZE (1..8)) OF INTEGER
(0..15)                                   OPTIONAL, -- Need M
    spatialRelationInfoToAddModList                        SEQUENCE (SIZE
(1..maxNrofSpatialRelationInfos))    OF    PUCCH-SpatialRelationInfo    OPTIONAL, --
Need N
    spatialRelationInfoToReleaseList                       SEQUENCE (SIZE
(1..maxNrofSpatialRelationInfos)) OF PUCCH-SpatialRelationInfoId
OPTIONAL, -- Need N
    pucchPowerControl                                      PUCCH-PowerControl
OPTIONAL, -- Need M
    ...
}
```

The parameter dl-DataToUL-ACK among the parameters relating to a PUCCH configuration may correspond to a K1 value, and may be 0 to 15. That is, the base station may indicate, to the terminal, a PUCCH resource among multiple PUCCH resources configured through higher layer signaling, as a PUCCH resource on which a HARQ-ACK for a PDSCH is to be transmitted, by using a PUCCH resource indicator in DCI, and the base station may identify a K1 value that is information relating to a timing at which the PUCCH is to be transmitted, from the parameter dl-DataToUL-ACK in configuration information of the PUCCH resource indicated to the terminal.

The base station may trigger aperiodic CSI reporting for the terminal by DCI scheduling a PDSCH, and the terminal may report corresponding CSI by using a PUCCH resource indicated by a PUCCH resource indicator in the DCI.

Figure 10:
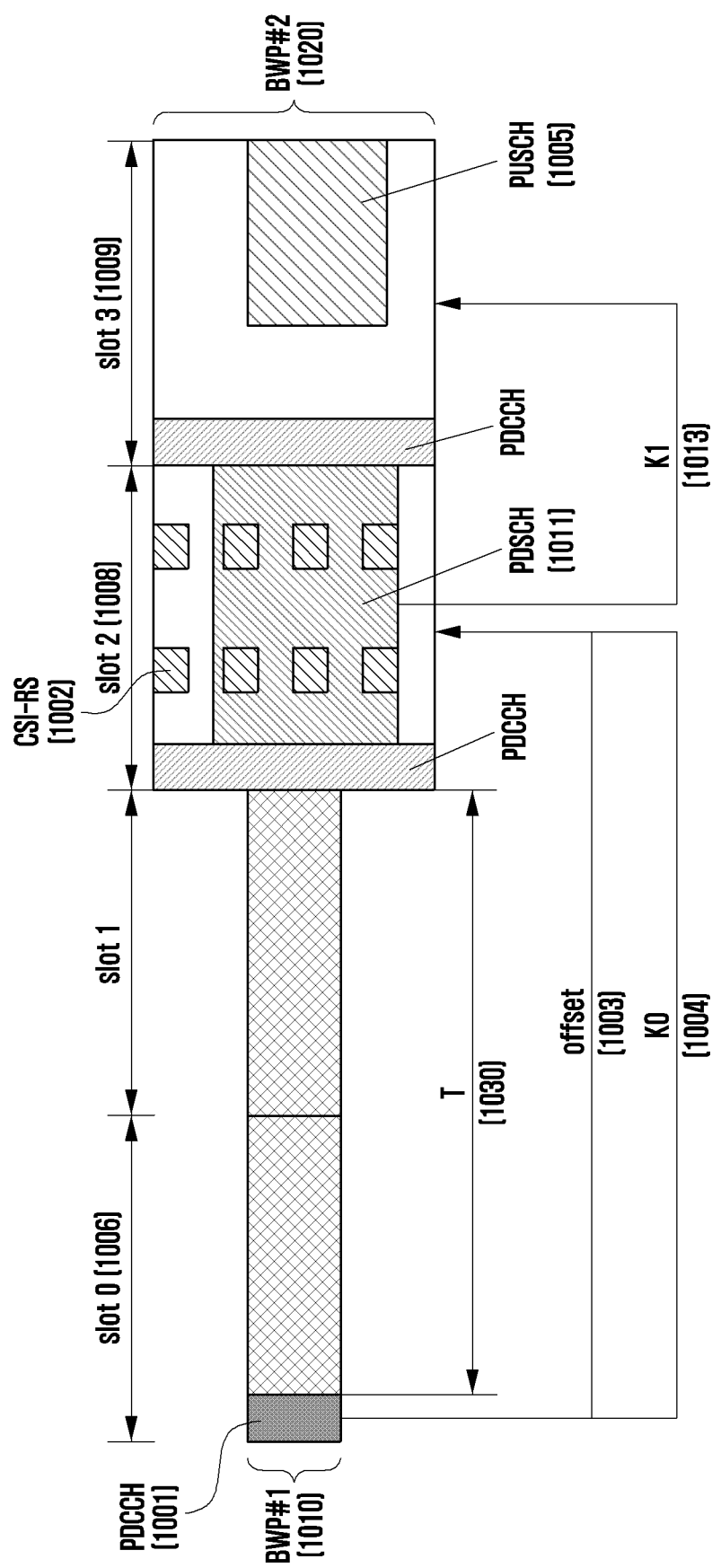
FIG. 10 illustrates a method of aperiodic CSI measurement and reporting according to an embodiment.

FIG. 10 illustrates a method of aperiodic CSI measurement and reporting according to an embodiment.

Referring to FIG. 10, BWP #1 1010 and BWP #2 1020 are configured for a terminal. If a current time point corresponds to slot 0 1006, BWP #1 1010 is an activated BWP, and the terminal may monitor a PDCCH 1001 in BWP #1 1010 to obtain DCI. The terminal may obtain scheduling information of a PUSCH 1011, resource information of a PUCCH 1005, a BWP indicator, and a CSI request indicator from the received DCI.

In FIG. 10, a BWP indicator included in DCI is assumed to indicate BWP #2 1020, and thus the PDSCH 1011 may be scheduled to BWP #2 1020 to be transmitted. In addition, a CSI request indicator is assumed to indicate a CSI-RS resource set of BWP #2 1020.

The terminal may perform a BWP change from BWP #1 1010 to BWP #2 1020 according to a BWP indicator in the received DCI. The terminal may expect that the terminal does not perform any transmission or reception during T 1030, which is a time interval from a third symbol of a slot 1006 in which a PDCCH 1001 having obtained DCI is transmitted to a starting point of a slot in which a PDSCH 1011 is scheduled. The starting point may be determined by the value of a K0 1004 in time domain resource allocation information of the PDSCH 1011.

The terminal may perform transmission or reception in BWP #2 1020 from slot 2 1008, based on the value of the K0 1004 indicated by the DCI. FIG. 10 illustrates an example in which the terminal performs a BWP change and then receives data through the PDSCH 1011 in BWP #2 1020 (i.e., the CSI request indicator indicates a CSI trigger state associated with a CSI reporting configuration associated with a CSI resource configuration configured to bwp-id=2, and for example, the CSI request indicator may correspond to a CSI request field of "11" in table 23).

The terminal may assume that a CSI-RS of BWP #2 1020 is transmitted at a time point at which the PDSCH 1011 is transmitted (i.e., slot 2 1008), and may measure the CSI-RS. That is, the terminal may assume that a resource offset 1003 of the CSI-RS corresponds to the K0 1004.

To determine a transmission time point of a CSI-RS, at least one of Methods 1 to 3 below, or a combination thereof, may be used.

Method 1

The terminal may neglect an offset-related parameter field value (e.g., aperiodicTriggeringOffset) in a CSI resource set configuration indicated by a CSI request indicator, and may assume that the field value is the same as K0.

Method 2

The terminal may expect that CSI reporting on a CSI resource set in which an offset-related parameter (value in a CSI resource set configuration indicated by a CSI request indicator is the same as K0 is to be triggered. That is, if the base station is to request CSI measurement and reporting on a changed BWP from the terminal, the base station may indicate a CSI trigger state associated with a CSI resource set having the same offset value as K0 by using a CSI request indicator.

Method 3

The terminal may expect that a K0 value indicated by a time domain resource allocation indicator of a PDSCH is indicated to be the same as an offset value in a CSI resource set configuration indicated by a CSI request indicator. That is, if the base station requests CSI measurement and reporting on a new BWP from the terminal by using a CSI request indicator, the base station may indicate a K2 value relating to a PDSCH, such that the K2 value is the same as an offset value in a CSI resource set triggered by the CSI request indicator.

A resource for a PUCCH 1005 through which an HARQ-ACK for the PDSCH 1011 is to be transmitted may be allocated to the terminal by a PUCCH resource indicator in the received DCI. The base station may identify the value of a K1 1013 that is information relating to a timing at which the PUCCH 1005 is to be transmitted, from the parameter dl-DataToUL-ACK in a resource configuration of the PUCCH 1005, indicated by the PUCCH resource indicator.

In FIG. 10, the value of the K1 1013 is assumed to be one slot, and accordingly, the terminal may transmit, through the PUCCH 1005, HARQ-ACK information relating to the PDSCH 1011 received in slot 2 1008, in slot 3 1009 positioned as much as the K1 1013, i.e., one slot later than slot 2. The terminal may multiplex CSI measured by using a CSI-RS 1002 received in slot 2 1008, with the HARQ-ACK information relating to the PDSCH 1011, and then transmit the multiplexed CSI and information through the PUCCH 1005 in slot 3 1009. As a HARQ-ACK on the PDSCH 1011 and the CSI are multiplexed, the size of uplink control information (UCI) transmitted through the PUCCH 1005 may be changed, and the terminal may reselect a resource of the PUCCH 1005 to be transmitted in slot 3 1009, based on a predefined series of methods.

As described above, a terminal can perform CSI measurement and reporting on a changed BWP as fast as possible. An aperiodic CSI request is indicated by using DCI scheduling a PDSCH, whereby there is a difference between a CSI measurement time point and a CSI reporting time point, and thus a terminal can ensure the time required to report CSI in UL after measuring and generating the CSI in DL. A base station can quickly obtain CSI relating to a changed BWP from a terminal, and effectively perform data transmission or reception in the changed BWP, based on the obtained CSI.

A terminal immediately performs CSI measurement and reporting on a changed BWP, so that the terminal can quickly complete various preparation processes (e.g., channel measurement, time and frequency tracking, AGC, etc.) for transmitting or receiving data in the changed BWP, and can effectively transmit or receive data. In addition, additional activation time for channel measurement and reporting of a terminal is minimized, so that the power consumption of the terminal can be reduced.

As described above, DL data indicator (e.g., a DL-SCH indicator) may be included in a DCI format indicating an aperiodic CSI request. If one bit corresponding to a DL data indicator in a DCI format indicates "1", this may indicate that a DL-SCH exists in a PDSCH scheduled by the DCI format. If one bit corresponding to the DL data indicator in a DCI format indicates "0", this may indicate that no DL-SCH exists in a PDSCH scheduled by the DCI format.

If aperiodic CSI reporting has been triggered by a CSI request indicator in DCI, and the DL data indicator indicates "1", the terminal may multiplex CSI with an HARQ-ACK for the DL-SCH by using a PUCCH resource indicated by the DCI, and then report the multiplexed CSI and HARQ-ACK to the base station.

If aperiodic CSI reporting has been triggered by a CSI request indicator in DCI, and the DL data indicator indicates "0", the terminal may map CSI to a PUCCH resource indicated by the DCI, and then report the mapped CSI to the base station. That is, aperiodic CSI reporting can be triggered by using a DL data indicator, without scheduling actual DL data.

If the terminal receives scheduling information of a PDSCH excluding DL data (e.g., a DL-SCH) through a DL data indicator (e.g., a DL-SCH indicator) field in DCI (i.e., one bit corresponding to the DL-SCH indicator indicates "0"), the terminal may apply the method illustrated in FIG. 10. That is, if a PDSCH only for CSI reporting, not for the purpose of transmitting DL data, is scheduled for the terminal from the base station, the terminal may perform the above described method for only CSI measurement and reporting on a new BWP. The terminal may report measured CSI to the base station after mapping the measured CSI to a PUCCH resource indicated by a PUCCH resource indicator in DCI.

If a K0 value in time domain resource allocation information of a PDSCH in DCI is larger than a particular threshold (9), the terminal may apply the method illustrated in FIG. 10. If a K0 value is larger, the terminal may sufficiently ensure time for preparations for a change to a new BWP, CSI measurement in the new BWP, and PUCCH transmission in the new BWP, and thus it may be easier for the terminal to perform CSI measurement and reporting on a new BWP. Therefore, if a K0 value is larger than a particular threshold, the terminal may perform the above described method for only CSI measurement and reporting on a new BWP.

The above-described embodiments may also be applied to TDD.

The above-described embodiments may be carried out in combination.

The above-described various embodiments may be applied to a single cell environment or a multi-cell environment (e.g., a carrier aggregation (CA)).

If one or more BWPs are configured for a terminal, a base station may instruct the terminal to change a BWP, by using a BWP indicator field in the DCI. For FDD, change of a UL BWP may be indicated by DCI (e.g., DCI format 0_1) scheduling a PUSCH, and change of a DL BWP may be indicated by DCI (e.g., DCI format 1_1) scheduling a PDSCH.

For convenience, some of the terms used below will be defined as follows.

DL DCI: DCI scheduling PDSCH
UL DCI: DCI scheduling PUSCH
BWP $A_{DL}$: a DL BWP which is currently activated
BWP $A_{UL}$: a UL BWP which is currently activated
BWP $B_{DL}$: a BWP indicated by a BWP indicator in DL DCI (or a BWP in which a PDSCH is scheduled)
BWP $B_{UL}$: a BWP indicated by a BWP indicator in UL DCI (or a BWP in which a PUSCH is scheduled)
BWP C: a DL BWP configured for a CSI resource indicated by a CSI request indicator in UL DCI (or a DL BWP in which a corresponding CSI-RS is transmitted)

In an operation according to FDD, in accordance with an aspect of the disclosure, a method is provided for measuring and reporting CSI relating to a changed DL BWP after a BWP change.

In relation to FDD, if a currently activated DL BWP (BWP $A_{DL}$) and a BWP (BWP C) in which a CSI-RS resource indicated by a CSI request indicator in UL DCI is transmitted are different (i.e., BWP $A_{DL}\ne$BWP C), the terminal may change a DL BWP to BWP C, receive a CSI-RS in the changed BWP, and report the CSI-RS to the base station through a PUSCH scheduled by the UL DCI.

Figure 11:
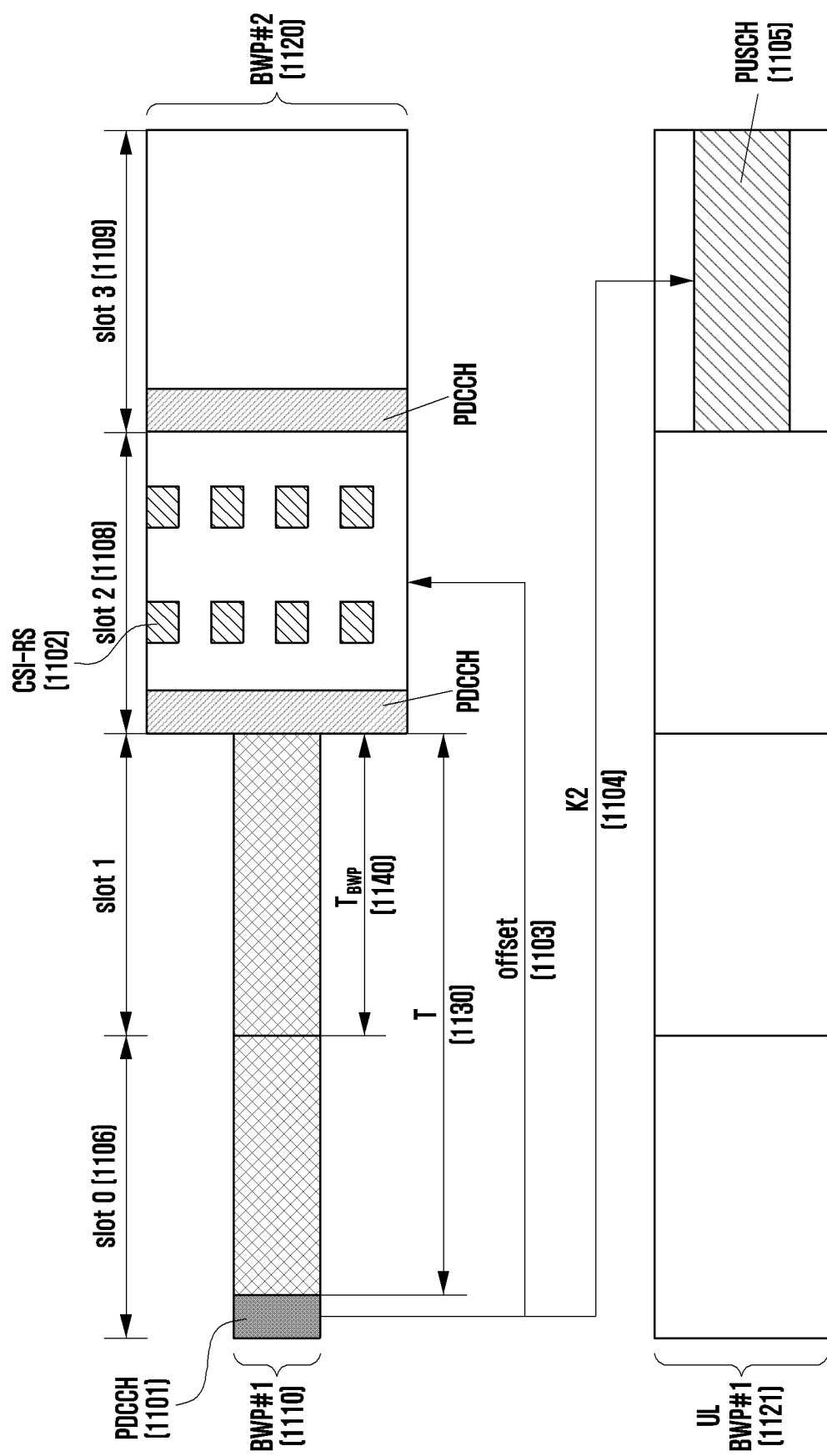
FIG. 11 illustrates a method of aperiodic CSI measurement and reporting according to an embodiment.

FIG. 11 illustrates a method of aperiodic CSI measurement and reporting according to an embodiment.

Referring to FIG. 11, DL BWP #1 1110 and DL BWP #2 1120, and UL BWP #1 1121 are configured for a terminal. If a current time point corresponds to slot 0 1106, DL BWP #1 1110 is an activated DL BWP, and the terminal may monitor a PDCCH 1101 in DL BWP #1 1110 to obtain DCI. The terminal may obtain scheduling information of a PUSCH 1105, a UL BWP indicator, and a CSI request indicator from the received DCI.

In FIG. 11, a UL BWP indicator included in DCI may indicate a currently activated UL BWP #1 1121, or a UL BWP indicator is not included in DCI because the number of UL BWPs configured for the terminal is one. That is, in FIG. 11, it is assumed that the PUSCH 1105 scheduled by the UL DCI is transmitted in a currently activated UL BWP, i.e., UL BWP #1 1121.

If a plurality of UL BWPs are configured for the terminal, it is also possible to change a UL BWP to a BWP indicated by a UL BWP indicator in UL DCI, and then transmit a PUSCH in the changed UL BWP.

In FIG. 11, a CSI request indicator in UL DCI received by the terminal is assumed to indicate a CSI-RS resource set of DL BWP #2 1120 (e.g., the CSI request indicator indicates a CSI trigger state associated with a CST reporting configuration associated with a CST resource configuration configured to bwp-id=2, and for example, the CSI request indicator may correspond to a CSI request field of "11" in table 23). That is, DL BWP #1 1110, which is a currently activated DL BWP, and DL BWP #2 1120, which is a DL BWP configured for a CST resource indicated by a CST request indicator in UL DCI, may be indicated differently.

The terminal may perform a BWP change to DL BWP #2 1120 that is a DL BWP configured for a CSI resource indicated by a CSI request indicator in received UL DCI. The value of an offset 1103 of the CSI resource indicated by the CSI request indicator in the UL DCI may be indicated to be larger than $T_{BWP}$ 1140 in consideration of $T_{BWP}$ that is a BWP change latency time interval. In FIG. 11, a BWP change latency time interval $T_B$WP of the terminal is assumed to be one slot, an offset value 1103 (e.g., aperiodicTriggeringOffset) of a CSI resource indicated by a CSI request indicator in DCI is assumed to be 2, and a scheduling offset value (K2 1104) of the PUSCH 1105 is assumed to be 3.

The terminal may expect that it does not perform any transmission or reception during T 1130, which is a time interval from a third symbol of a slot 1106 in which a PDCCH 1101 having obtained UL DCI is transmitted to a starting point of a slot in which a CSI-RS 1102 is transmitted. The starting point may be determined by the offset 1103 of the CSI resource. The terminal may perform transmission or reception in DL BWP #2 1120 from slot 2 1109, based on the value of the offset 1103 of the CSI resource indicated by the UL DCI. The terminal may receive the CSI-RS 1102 transmitted in DL BWP #2 1120, in slot 2 1108, and measure and generate CSI. The terminal may report the measured CSI through the PUSCH 1105 (i.e., PUSCH scheduled by obtained UL DCI) of slot 3 1109 to the base station.

As described above, a terminal can perform CSI measurement and reporting on a changed DL BWP as fast and effectively as possible in an FDD environment. A DL BWP changing function (i.e., a change to a DL BWP in which a CSI-RS is transmitted) is also supported as well as an aperiodic CSI request by UL DCI, and thus DL DCI scheduling a PDSCH to change a DL BWP in FDD may not be required to be additionally transmitted. A base station can quickly obtain CSI relating to a new BWP from a terminal, and effectively perform data transmission or reception in the new BWP, based on the obtained CSI.

In accordance with the above-described embodiments, a terminal more efficiently performs CSI measurement and reporting on a changed BWP, so that the terminal can quickly complete various preparation processes (e.g., channel measurement, time and frequency tracking, AGC, etc.) for transmitting or receiving data in the changed BWP, and can effectively transmit or receive data. In addition, additional activation time for channel measurement and reporting of a terminal is minimized, reducing the power consumption of the terminal.

The above-described embodiments may be applied to a case of FDD. However, the disclosure is not limited thereto, and the second embodiment may also be applied to a case of TDD.

The above-described embodiments may be carried out in combination.

The above-described embodiments may be partially applied to a single cell environment or a multi-cell environment (e.g., CA).

As described above, field values (or code points) of a CSI request indicator may be associated with CSI trigger states, and each CSI trigger state may be associated with a CSI reporting configuration and a CSI resource configuration. A CSI reporting configuration may be configured to be associated with a particular cell through a cell index parameter (e.g., ServCellIndex), and a CSI resource configuration may be associated with a particular BWP through a BWP index parameter (e.g., bwp-id). A terminal may obtain DCI, and then generate CSI by measuring a CSI resource transmitted in a BWP corresponding to a BWP index in a CSI resource configuration, in a cell corresponding to a cell index in a CSI reporting configuration indicated by a CSI request indicator in the DCI. The terminal may report the generated CSI to a base station by using a PUSCH scheduled by the DCI.

Table 25 below shows an example of a CSI request indicator. In Table 25, one CSI request indicator value may be associated with (or may indicate) multiple CSI reporting configurations and multiple CSI resource configurations. Cell indices in the multiple CSC reporting configurations associated with the one CSI request indicator value may be identical or different. In addition, bandwidth part indices in the multiple CSI resource configurations associated with the one CSI request indicator value may be identical or different.

TABLE 25

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report# (ServCellIndex = 1) | CSI resource#1, (bwp-id = 1) |
|  |  | CSI report#2 (ServCellIndex = 1) | CSI resource#2 (bwp-id = 2) |
| 10 | CSI trigger state#2 | CSI report#3 (ServCellIndex = 2) | CSI resource#3 (bwp-id = 1) |
|  |  | CSI report#4 (ServCellIndex = 3) | CSI resource#4 (bwp-id = 1) |
| 11 | CSI trigger state#3 | CSI report#5 (ServCellIndex = 4) | CSI resource#5 (bwp-id = 1) |
|  |  | CSI report# (ServCellIndex = 5) | CSI resource#6 (bwp-id = 2) |

The terminal may not expect that aperiodic CSI reporting is triggered with respect to a BWP that is not currently activated. Only one BWP can be activated in one cell, and thus a case where a field value of a particular CSI request indicator is associated with CSI resource configurations relating to different BWPs in the same cell may be problematic.

In accordance with an aspect of the disclosure, different methods for solving the problem are provided below.

Method 1

If a terminal obtains a CSI request indicator associated with CSI resource configurations of different BWPs in the same cell, the terminal may measure, in the CSI resource configurations indicated by the CSI request indicator, a CSI resource configured to have a BWP index identical to a currently activated BWP, and neglect information relating to a CSI resource configured to have a BWP index different from the currently activated BWP.

For example, if the terminal receives "01" as a CSI request indicator, as shown in Table 25 above, and a currently activated BWP is BWP #1, the terminal may measure only CSI resource #1 configured to have bwp-id of 1, and may not measure CSI resource #2 configured to have bwp-id of 2. The terminal may report CSI generated based on the measurement of the CSI resource, to a base station.

Method 2

A terminal may not expect that one CSI request indicator field value is configured to be associated with multiple CSI resources in different BWPs in the same cell. That is, one CSI request indicator field value may be associated with only CSI resources in the same BWP in the same cell. For example, the terminal may not expect an association configuration such as CSI reporting and resource configurations corresponding to a CSI request indicator field value of "01", as shown in Table 25.

Method 3

A terminal may not expect receiving of a CSI request indicator field value associated with multiple CSI resources in different BWPs in the same cell. For example, the terminal may not expect receiving of a CSI request indicator field value of "01", as shown in Table 25.

A CSI-RS may have a quasi-co-located (QCL) relationship with other RSs. In 5G, the four QCL types may be supported as below.

"QCL-Type A": (Doppler shift, Doppler spread, average delay, delay spread)
"QCL-Type B": {Doppler shift, Doppler spread}
"QCL-Type C": {Doppler shift, average delay}
"QCL-Type D": (Spatial Rx parameter (antenna reception parameter))

Some RSs may be quasi-co-located in at least one QCL type among the QCL types, and a terminal may assume that RSs quasi-co-located in a particular QCL type have the same parameters defined by the QCL type.

With respect to aperiodic CSI reporting, an offset of a CSI-RS (e.g., aperiodicTriggeringOffset) may be configured by higher layer signaling. The terminal may receive a CSI-RS at a time point considering an offset in a CSI resource set configuration indicated by a CSI request indicator, and generate CSI.

If all of the CSI-RSs in a CSI trigger state, which are associated with each other, are not configured in a QCL-TypeD (i.e., a higher layer parameter qcl-Type is not configured to be "QCL-TypeD"), an offset value of a CSI-RS may be fixed to 0. For example, if a communication frequency band corresponds to low frequency (e.g., a frequency range 1 (FR 1), or a frequency band of 6 GHz or lower), the band may not support QCL-TypeD, and thus an offset value of a CSI-RS may be fixed to 0. If a communication frequency band corresponds to high frequency (e.g., frequency range 2 (FR 2), or a frequency band of 6 GHz or higher), QCL-TypeD may be configured, and thus an offset value of a CSI-RS may be configured to be larger than 0.

The terminal may identify, based on a K0 (or K2) value in a time domain resource allocation information for a PDSCH (or a PUSCH), the position of a slot in which the corresponding data channel is scheduled. If the terminal receives a PDCCH scheduling a PDSCH, in slot n, and receives K0 of 0, this may indicate that the PDSCH is scheduled in slot n. A scenario in which a control channel and a data channel are scheduled in the same slot, i.e., a slot offset value (K0, K2) is 0, may be referred to as "self-slot scheduling".

As another example, if the terminal receives a PDCCH scheduling a PDSCH, in slot n, and receives the value of K0 expressed by K0=1>0, this may indicate that the PDSCH is scheduled in slot n+1. A scenario in which a data channel is scheduled in a slot after a control channel, i.e., a slot offset value (K0, K2) is larger than 0, may be referred to as "cross-slot scheduling".

If the terminal has previously identified that a data channel is to be cross-slot-scheduled, the terminal may perform an additional power consumption reducing operation. For example, the terminal may reduce power consumption by performing at least one of the following power consumption reduction operations.

- in a slot in which a PDCCH is received, during a time interval for which the PDCCH is decoded, the terminal may not buffer a symbol to which a PDSCH may be scheduled.
- in a slot in which a PDCCH is received, after the reception of the PDCCH, the terminal may operate in a sleep mode during a remaining time interval. A sleep mode may indicate that the terminal does not activate the function of all or a part of terminal operation elements (e.g., a baseband operation or radio frequency (RF) circuit) in order to reduce power consumption.
- the terminal may decode a received PDCCH with lowered processing speed.

In order to support cross-slot scheduling, a base station may configure all of the slot offset values (K0, K2) in time domain resource allocation information (e.g., a table) of a data channel, which may be configured through higher layer signaling (e.g., an SIB or RRC), to be larger than 0 for the terminal. If time domain resource allocation information including all of the slot offset values larger than 0 is configured for the terminal by the base station, the terminal may identify that cross-slot scheduling is always performed, and thus the terminal may reduce power consumption by performing the above-described power consumption reduction operations.

Even if cross-slot scheduling of a data channel is configured (e.g., all of the slot offset values (K0, K2) in time domain resource allocation information are configured to be larger than 0, or the base station notifies the terminal that cross-slot scheduling is to be performed (e.g., the minimum slot offset value (K0, K2) which can be scheduled is configured to be larger than 0)), the terminal may be required to perform CSI measurement and reporting by an aperiodic CSI request, and thus fail to perform the above-described power consumption reduction operations.

For example, if a PDCCH received in slot n triggers aperiodic CSI reporting, and the offset value of a CSI-RS is 0, the terminal should measure the CSI-RS transmitted in slot n having received the PDCCH. The terminal should be able to receive the CSI-RS in the slot having received the PDCCH, and is thus unable to perform the above-described power consumption reduction operations. Therefore, for the terminal to reduce power consumption, an offset value of a CSI-RS should be configured to be larger than 0.

In accordance with an aspect of the disclosure, a CSI-RS resource configuring methods for power consumption reduction of the terminal are provided below.

Method 1

If cross-slot scheduling of a data channel is configured (e.g., all of the slot offset values (K0, K2) in a time domain resource allocation table are configured to be larger than 0, the base station notifies the terminal through a series of methods that cross-slot scheduling is to be performed, or the minimum slot offset value (K0, K2) which can be scheduled is configured to be larger than 0), the terminal may not expect that aperiodic CSI reporting of a CSI-RS with an offset value of 0 is triggered.

Alternatively, the terminal may not expect that the offset values of all the CSI-RS resource sets for aperiodic CSI reporting are configured to be 0.

The application of Method 1 may be limited to frequency range 2.

Method 2

If cross-slot scheduling of a data channel is configured (e.g., all the slot offset values (K0, K2) in a time domain resource allocation table are configured to be larger than 0, the base station notifies the terminal through a series of methods that cross-slot scheduling is to be performed, or the minimum slot offset value (K0, K2) which can be scheduled is configured to be larger than 0), the terminal may not expect that aperiodic CSI reporting of a CSI-RS with an offset value of 0 is triggered in a different slot, except for a slot in which a PDSCH is scheduled. That is, if a PDSCH is scheduled in a slot n, the terminal may expect that aperiodic CSI reporting of a CSI-RS with an offset of 0 may be triggered in slot n. On the contrary, if a PDSCH is not scheduled in a slot n for the terminal, the terminal may not expect that aperiodic CSI reporting of a CSI-RS with an offset of 0 may be triggered in slot n.

The application of Method 2 may be limited to frequency range 1.

Alternatively, the application of Method 2 may be limited to a case where if all the CSI-RSs in a CSI trigger state are not configured in a QCL-TypeD (i.e., a higher layer parameter qcl-Type is not configured to be "QCL-TypeD"), an offset value of a CSI-RS as described above is fixed to 0.

Method 3

If cross-slot scheduling of a data channel is configured, the terminal may expect that aperiodic CSI reporting is to be triggered only with respect to a CSI-RS having a gap equal to or greater than a particular symbol interval, between a last symbol of a PDCCH and a first symbol of the CSI-RS.

Alternatively, all of the CSI-RS resources for aperiodic CSI reporting may be configured to ensure a gap greater than or equal to a particular symbol interval, between a last symbol of a PDCCH and a first symbol of a CSI-RS.

Figure 12:
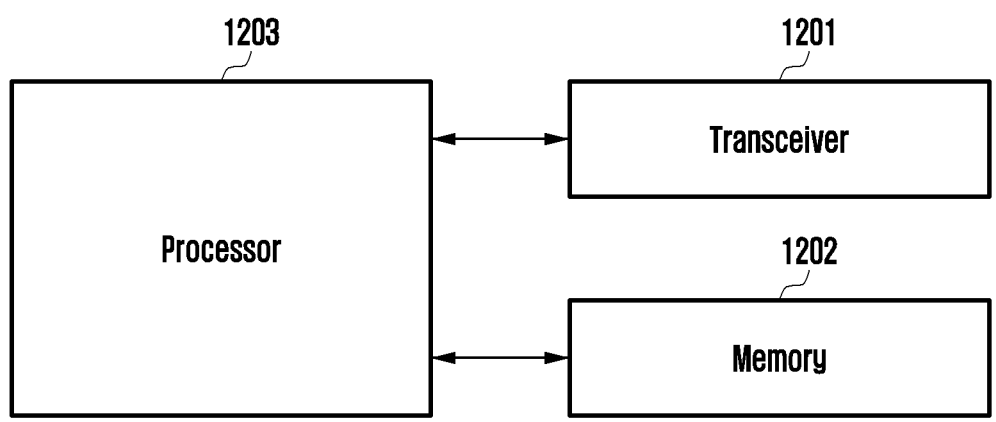
FIG. 12 illustrates a terminal according to an embodiment.
Figure 13:
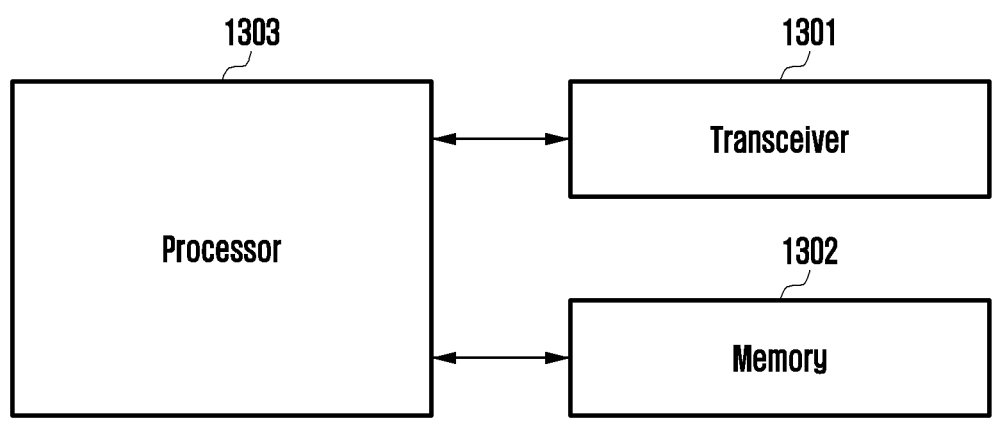
FIG. 13 illustrates a base station according to an embodiment.

FIGS. 12 and 13 illustrate a transceiver, a memory, and a processor of a terminal and a base station to perform the embodiments above, respectively. The disclosure provides a CSI measurement and reporting method corresponding to the above embodiments and a method for transmission or reception between a base station and a terminal for application of a data transmission or reception operation according to the above method. Further, a transceiver, a memory, and a processor of a terminal and a base station should operate to perform the methods according to embodiments, respectively.

FIG. 12 illustrates a terminal according to an embodiment.

Referring to FIG. 12, a terminal includes a transceiver 1201, a memory 1202, and a processor 1203. Alternatively, the terminal may include more or less elements than illustrated in FIG. 12. In addition, the transceiver 1201, the memory 1202, and the processor 1203 may be implemented into a single chip.

The transceiver 1201 may transmit a signal to a base station, or receive a signal from the base station. The signal may include control information and data. The transceiver 1201 may include an RF transmitter that up-converts and amplifies a frequency of a transmitted signal, an RF receiver that low-noise amplifies a received signal and down-converts the frequency, etc. In addition, the transceiver 1201 may receive a signal through a wireless channel and output the signal to the processor 1203, and may transmit a signal output from the processor 1203, through a wireless channel.

The memory 1202 may store a program and data required for an operation of the terminal. In addition, the memory 1202 may store control information or data included in a signal transmitted or received by the terminal. The memory 1202 may be configured by a storage medium such as a read only memory (ROM), a random access memory (RAM), a hard disk, a compact disc ROM (CD-ROM), and a digital versatile disc (DVD), or a combination of these and/or other storage mediums. In addition, the memory 1202 may be configured by a plurality of memories. The memory 1202 may store a program for a CSI measurement/reporting method of the terminal, and a data transmission/reception operation according to the method.

The processor 1203 may control a series of processes in which the terminal may operate according to embodiments described above. For example, the processor 1203 may differently control a CSI measurement/reporting method of the terminal according to embodiments, and a data transmission/reception operation according to the method. In addition, the processor 1203 may include a plurality of processors, and differently control a CSI measurement/reporting method of the terminal according to embodiments, and a data transmission/reception operation according to the method by executing the program stored in the memory 1202.

FIG. 13 illustrates a base station according to an embodiment.

Referring to FIG. 13, a base station includes a transceiver 1301, a memory 1302, and a processor 1303. Alternatively, a base station may include more or less elements than illustrated in FIG. 13. In addition, the transceiver 1301, the memory 1302, and the processor 1303 may be implemented into a single chip.

The transceiver 1301 may transmit a signal to a terminal, or receive a signal from the terminal. The signal may include control information and data. The transceiver 1301 may include an RF transmitter that up-converts and amplifies a frequency of a transmitted signal, an RF receiver that low-noise amplifies a received signal and down-converts the frequency, etc. In addition, the transceiver 1301 may receive a signal through a wireless channel and output the signal to the processor 1303, and may transmit a signal output from the processor 1303, through a wireless channel.

The memory 1302 may store a program and data required for an operation of a terminal. In addition, the memory 1302 may store control information or data included in a signal transmitted or received by a terminal. The memory 1302 may be configured by a storage medium such as a ROM, a RAM, a hard disk, a CD-ROM, and a DVD, or a combination of these and/or other storage mediums. In addition, the memory 1302 may include a plurality of memories. The memory 1302 may store a program for a CSI configuration/triggering method of the base station, and a data transmission/reception operation according to the method.

The processor 1303 may control a series of processes so that the base station can operate according to embodiments described above. For example, the processor 1303 may differently control a CSI configuration/triggering method of the base station according to embodiments, and a data transmission/reception operation according to the method. In addition, the processor 1303 may include a plurality of processors, and differently control a CSI configuration/triggering method of the base station according to embodiments, and a data transmission/reception operation according to the method by executing the program stored in the memory 1302.

In the above-described embodiments of the disclosure, an element included expressed in the singular or the plural according to presented embodiment is not limited by to the singular or the plural. Instead, an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. As will be apparent to those skilled in the art, other modifications and changes may be made thereto based on the technical spirit of the disclosure. Further, the above respective embodiments may be employed in combination, as necessary. For example, the embodiments of the disclosure may be partially combined to operate a base station and a terminal. The embodiments of the disclosure may be applied to other communication systems, and other variants based on the technical idea of the embodiments may be implemented.

In a wireless communication system in which a BWP is configured and operated according to the above-described embodiments, if an activated BWP is changed, a channel state of a changed BWP is effectively measured and reported, and data can be more efficiently transmitted or received in the changed BWP, thereby reducing power consumption of a terminal.

While the disclosure has been shown and described with reference to certain preferred embodiments thereof, it will be understood by those skilled in the art that various changes in form and details may be made therein without departing from the spirit and scope of the disclosure as defined by the appended claims and any equivalents thereof.

What is claimed is:

1. A method performed by a terminal in a wireless communication system, the method comprising:
   receiving, from a base station, information configuring a list of aperiodic trigger states for channel state information (CSI); and
   receiving, from the base station, downlink control information (DCI) including a CSI request field, wherein a codepoint of the CSI request field is associated with one trigger state of the list, and wherein the one trigger state comprises at least one CSI report configuration, a CSI report configuration comprises a CSI resource configuration, and the CSI resource configuration comprises a bandwidth part (BWP) identifier (ID),
   wherein in case that a CSI report for a non-active BWP is triggered based on the CSI request field, a measurement based on a CSI resource in the non-active BWP is not performed.

2. The method of claim 1, wherein the CSI report configuration further comprises a serving cell index.

3. The method of claim 1, wherein the information configuring the list is received based on a radio resource control (RRC) signaling.

4. The method of claim 1,
   wherein in case that the BWP ID in the CSI resource configuration identified by the codepoint of the CSI request field is different from a BWP ID of an active BWP, a BWP corresponding to the BWP ID in the CSI resource configuration is the non-active BWP.

5. The method of claim 1, further comprising:
   in case that a CSI report for an active BWP is triggered based on the CSI request field, performing a measurement based on a CSI resource in the active BWP.

6. A method performed by a base station in a wireless communication system, the method comprising:
   transmitting, to a terminal, information configuring a list of aperiodic trigger states for channel state information (CSI); and
   transmitting, to the terminal, downlink control information (DCI) including a CSI request field,
   wherein a codepoint of the CSI request field is associated with one trigger state of the list, wherein the one trigger state comprises at least one CSI report configuration, a CSI report configuration comprises a CSI resource configuration, and the CSI resource configuration comprises a bandwidth part (BWP) identifier (ID), and
   wherein in case that a CSI report for a non-active BWP is triggered based on the CSI request field, a measurement based on a CSI resource in the non-active BWP is not performed.

7. The method of claim 6, wherein the CSI report configuration further comprises a serving cell index.

8. The method of claim 6, wherein the information configuring the list is transmitted via a radio resource control (RRC) signaling.

9. The method of claim 6,
   wherein in case that the BWP ID in the CSI resource configuration identified by the codepoint of the CSI request field is different from a BWP ID of an active BWP, a BWP corresponding to the BWP ID in the CSI resource configuration is the non-active BWP.

10. The method of claim 6, further comprising:
    in case that a CSI report for an active BWP is triggered based on the CSI request field, receiving, from the terminal, CSI associated with a measurement based on a CSI resource in the active BWP.

11. A terminal in a wireless communication system, the terminal comprising:
    a transceiver; and
    a processor configured to:
    receive, from a base station, information configuring a list of aperiodic trigger states for channel state information (CSI), and
    receive, from the base station, downlink control information (DCI) including a CSI request field, wherein a codepoint of the CSI request field is associated with one trigger state of the list, and wherein the one trigger state comprises at least one CSI report configuration, a CSI report configuration comprises a CSI resource configuration, and the CSI resource configuration comprises a bandwidth part (BWP) identifier (ID),
    wherein in case that a CSI report for a non-active BWP is triggered based on the CSI request field, a measurement based on a CSI resource in the non-active BWP is not performed.

12. The terminal of claim 11, wherein the CSI report configuration further comprises a serving cell index.

13. The terminal of claim 11, wherein the information configuring the list is received based on a radio resource control (RRC) signaling.

14. The terminal of claim 11,
    wherein in case that the BWP ID in the CSI resource configuration identified by the codepoint of the CSI request field is different from a BWP ID of an active BWP, a BWP corresponding to the BWP ID in the CSI resource configuration is the non-active BWP.

15. The terminal of claim 11, wherein the processor is further configured to:
    in case that a CSI report for an active BWP is triggered based on the CSI request field, perform a measurement based on a CSI resource in the active BWP.

16. A base station in a wireless communication system, the base station comprising:
    a transceiver; and
    a processor configured to:
    transmit, to a terminal, information configuring a list of aperiodic trigger states for channel state information (CSI), and
    transmit, to the terminal, downlink control information (DCI) including a CSI request field,
    wherein a codepoint of the CSI request field is associated with one trigger state of the list, wherein the one trigger state comprises at least one CSI report configuration, a CSI report configuration comprises a CSI resource configuration, and the CSI resource configuration comprises a bandwidth part (BWP) identifier (ID), and
    wherein in case that a CSI report for a non-active BWP is triggered based on the CSI request field, a measurement based on a CSI resource in the non-active BWP is not performed.

17. The base station of claim 16, wherein the CSI report configuration further comprises a serving cell index.

18. The base station of claim 16, wherein the information configuring the list is transmitted via a radio resource control (RRC) signaling.

19. The base station of claim 16,
wherein in case that the BWP ID in the CSI resource configuration identified by the codepoint of the CSI request field is different from a BWP ID of an active BWP, a BWP corresponding to the BWP ID in the CSI resource configuration is the non-active BWP.

20. The base station of claim 16, wherein the processor is further configured to, in case that a CSI report for an active BWP is triggered based on the CSI request field, receive, from the terminal, CSI associated with a measurement based on a CSI resource in the active BWP.

* * * * *